US011428350B2

(12) United States Patent
Dhagat et al.

(10) Patent No.: US 11,428,350 B2
(45) Date of Patent: Aug. 30, 2022

(54) PIPE REINFORCEMENT STRIP ANCHORING SYSTEMS AND METHODS

(71) Applicant: Trinity Bay Equipment Holdings, LLC, Houston, TX (US)

(72) Inventors: Alok Dhagat, Katy, TX (US); Kirk Spencer Francis, Richmond, TX (US); Mark Douglas Kalman, Luthersville, TX (US)

(73) Assignee: Trinity Bay Equipment Holdings, LLC, Houston, TX (US)

( * ) Notice: Subject to any disclaimer, the term of this patent is extended or adjusted under 35 U.S.C. 154(b) by 0 days.

(21) Appl. No.: 17/343,827

(22) Filed: Jun. 10, 2021

(65) Prior Publication Data
US 2022/0025995 A1 Jan. 27, 2022

Related U.S. Application Data

(60) Provisional application No. 63/054,873, filed on Jul. 22, 2020.

(51) Int. Cl.
*F16L 13/11* (2006.01)
*F16L 33/28* (2006.01)
(Continued)

(52) U.S. Cl.
CPC ........... *F16L 13/116* (2013.01); *F16L 11/081* (2013.01); *F16L 33/01* (2013.01); *F16L 33/28* (2013.01)

(58) Field of Classification Search
CPC ...... F16L 13/116; F16L 11/081; F16L 11/083; F16L 33/01; F16L 33/22; F16L 33/28; F16L 13/11
(Continued)

(56) References Cited

U.S. PATENT DOCUMENTS 9,976,681 B2 * 5/2018 Karabelas ............... F16L 33/28
10,113,677 B2 * 10/2018 Bourget .................. F16L 33/01
(Continued)

FOREIGN PATENT DOCUMENTS

JP         04171390 A  *  6/1992      ............. F16L 33/01
WO      2015082275 A1     6/2015
WO      2019239115 A1    12/2019

OTHER PUBLICATIONS

Christian Brown, "Too Tight or Perfect Fit? When to Use Press Fits in Your Assemblies", May 8, 2017, pp. 1-11 (Year: 2017).*
(Continued)

*Primary Examiner* — Zachary T Dragicevich
*Assistant Examiner* — William S. Choi
(74) *Attorney, Agent, or Firm* — Conrad J. Hsu

(57) ABSTRACT

Techniques for implementing a system that includes pipe segment tubing and a pipe fitting to be secured to the pipe segment tubing. The pipe segment tubing includes a reinforcement strip implemented between an internal pressure sheath layer and an outer sheath of the pipe segment tubing. The pipe fitting includes an inner fitting body to be inserted between the internal pressure sheath layer and the reinforcement strip of the pipe segment tubing. Additionally, the pipe fitting includes an outer fitting body to be disposed circumferentially around the inner fitting body to define a potting cavity between an inner surface of the outer fitting body and an outer surface of the inner fitting body, in which a hole is formed through the reinforcement strip of the pipe segment tubing before the reinforcement strip is anchored in the potting cavity via cured potting material.

20 Claims, 10 Drawing Sheets

(51) Int. Cl.
*F16L 33/01* (2006.01)
*F16L 11/08* (2006.01)

(58) Field of Classification Search
USPC ............ 285/211, 222.1, 222.2, 222.3, 222.4, 285/222.5
See application file for complete search history.

(56) References Cited

U.S. PATENT DOCUMENTS

| | | | |
|---|---|---|---|
| 10,890,506 B2* | 1/2021 | Nicolas | F16L 11/083 |
| 2010/0025985 A1 | 2/2010 | De Aquino et al. | |
| 2012/0211975 A1* | 8/2012 | Campello | F16L 33/01 285/222.2 |
| 2015/0292663 A1 | 10/2015 | Glejbol et al. | |
| 2016/0069494 A1* | 3/2016 | Paulo | F16L 33/01 |
| 2016/0208969 A1* | 7/2016 | Bertoni | F16L 33/01 |
| 2020/0080674 A1 | 3/2020 | Clements et al. | |
| 2021/0108743 A1 | 4/2021 | Dehais | |

OTHER PUBLICATIONS http://www.socket-lock.com/socketing_procedure.html; Socket Lock; Mar. 17, 2020.

* cited by examiner

PIPE REINFORCEMENT STRIP ANCHORING SYSTEMS AND METHODS

CROSS-REFERENCE

The present disclosure claims priority to and benefit of U.S. Provisional Patent Application No. 63/054,873, entitled "PIPE REINFORCEMENT STRIP ANCHORING SYSTEMS AND METHODS" and filed Jul. 22, 2020, which is incorporated herein by reference in its entirety for all purposes.

BACKGROUND

Flexible pipe can be utilized to transport production fluids, such as oil and/or gas and/or water, from one location to another. Flexible pipe is generally formed as an assembly of a portion of flexible pipe body and one or more end fittings. The end fittings may be used to connect segments of flexible pipe together or to connect them to terminal equipment, such as sub-sea structures or floating facilities. End fittings are important components for terminating and anchoring the pipe layers, sealing and venting gas in these environments.

Existing end fittings have certain deficiencies and disadvantages. For example, current end fittings used with offshore flexible pipe as described in API RP 17B ("17B Recommended Practice for Unbonded Flexible Pipe") with carcass are costly and have a long duration installation time. Improvements in this field of technology are therefore desired.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one embodiment, a system includes pipe segment tubing and a pipe fitting to be secured to the pipe segment tubing. The pipe segment tubing includes a reinforcement strip between an internal pressure sheath layer and an outer sheath of the pipe segment tubing. The pipe fitting includes an inner fitting body to be inserted between the internal pressure sheath layer and the reinforcement strip of the pipe segment tubing. Additionally, the pipe fitting includes an outer fitting body to be disposed circumferentially around the inner fitting body to define a potting cavity between an inner surface of the outer fitting body and an outer surface of the inner fitting body, in which a hole is formed through the reinforcement strip of the pipe segment tubing before the reinforcement strip is anchored in the potting cavity via cured potting material.

In another embodiment, a method of securing pipe segment tubing in a pipe fitting includes modifying structure of a reinforcement strip in the pipe segment tubing at least in part by forming an opening in the reinforcement strip; after the structure of the reinforcement strip has been modified, defining a potting cavity of the pipe fitting circumferentially around and connected to a bore of the pipe fitting at least in part by inserting an inner fitting body of the pipe fitting under the reinforcement strip and securing an outer fitting body of the pipe fitting around a portion of the reinforcement strip and the inner fitting body of the pipe fitting; and anchoring the reinforcement strip of the pipe segment tubing in the potting cavity of the pipe fitting at least in part by implementing cured potting material within the potting cavity.

In another embodiment, a pipe segment to be secured and sealed in a pipe fitting includes an internal pressure sheath that defines a pipe bore through the pipe segment; a reinforcement strip implemented around the internal pressure sheath, in which the reinforcement strip is implemented using solid material that has a higher tensile strength, a higher linear elasticity modulus, or both as compared to solid material that is used to implement the internal pressure sheath of the pipe segment; and an outer sheath implemented around the reinforcement strip. The outer sheath is cut back to expose a portion of the reinforcement strip that is to be anchored in a potting cavity of the pipe fitting at least in part using cured potting material implemented within the potting cavity and structure of the reinforcement strip is modified before being anchored in the potting cavity of the pipe fitting at least in part by forming an opening through the reinforcement strip.

DETAILED DESCRIPTION

Figure 1:
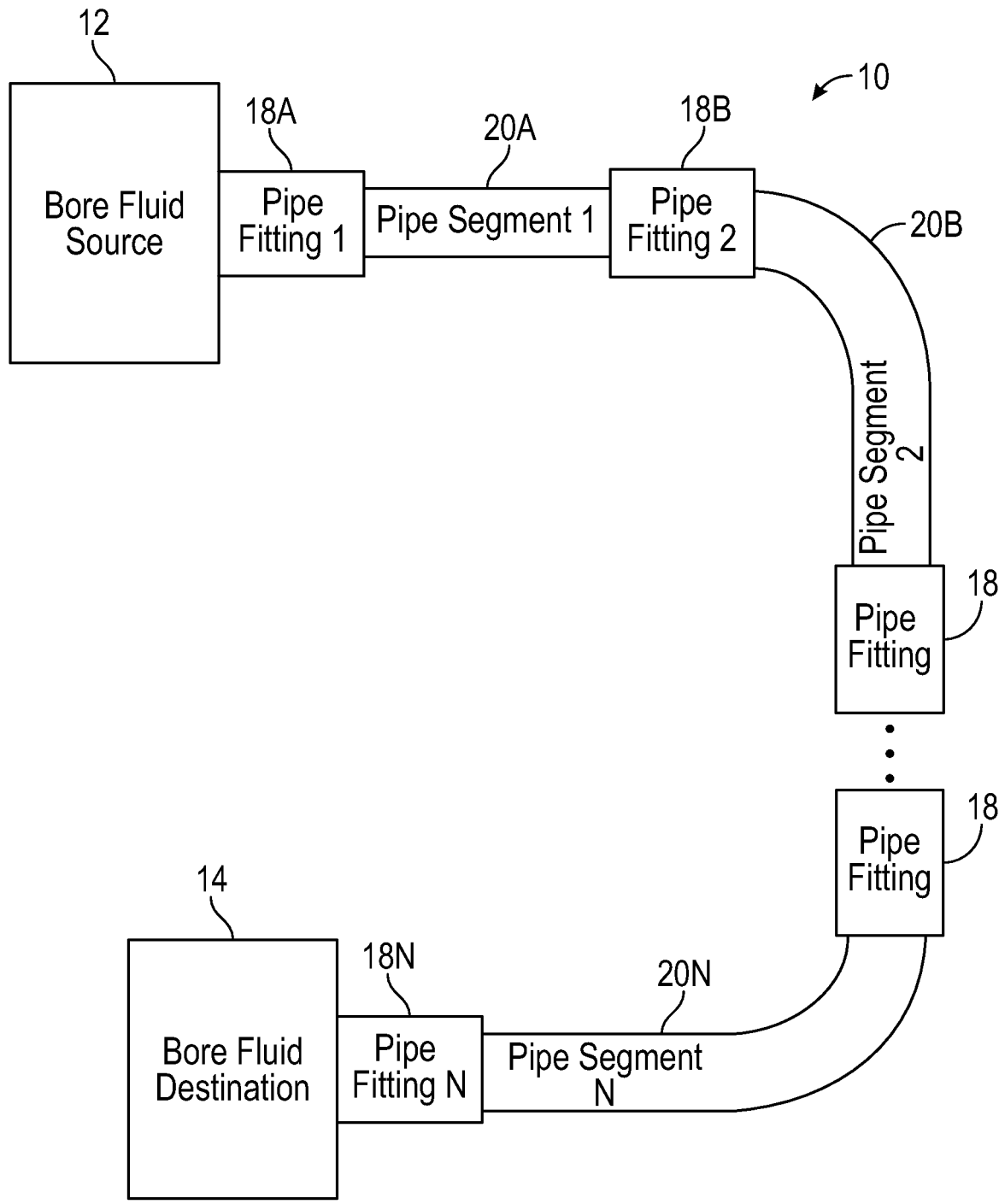
FIG. 1 is a block diagram of an example of a pipeline system including pipe segments and pipe fittings, in accordance with an embodiment of the present disclosure.

One or more specific embodiments of the present disclosure will be described below with reference to the figures. As used herein, the term "coupled" or "coupled to" may indicate establishing either a direct or indirect connection and, thus, is not limited to either unless expressly referenced as such. The term "set" may refer to one or more items. Wherever possible, like or identical reference numerals are used in the figures to identify common or the same features. The figures are not necessarily to scale. In particular, certain features and/or certain views of the figures may be shown exaggerated in scale for purposes of clarification.

The present disclosure generally relates to pipeline systems that may be implemented and/or operated to transport (e.g., convey) fluid, such as liquid and/or gas, from a fluid source to a fluid destination. Generally, a pipeline system may include pipe fittings, such as a midline pipe fitting and/or a pipe end fitting, and one or more pipe segments. More specifically, a pipe segment may generally be secured and sealed in one or more pipe fittings to facilitate fluidly coupling the pipe segment to another pipeline component, such as another pipe segment, another pipe fitting, a fluid source, and/or a fluid destination. Merely as an illustrative non-limiting example, a pipeline system may include a first pipe end fitting secured to a first pipe segment to facilitate fluidly coupling the first pipe segment to the fluid source, a midline pipe fitting secured between the first pipe segment and a second pipe segment to facilitate fluidly coupling the first pipe segment to the second pipe segment, and a second pipe end fitting secured to the second pipe segment to facilitate fluidly coupling the second pipe segment to the fluid destination.

In any case, a pipe segment generally includes tubing that defines (e.g., encloses) a pipe bore, which provides a primary fluid conveyance (e.g., flow) path through the pipe segment. More specifically, the tubing of a pipe segment may be formed to facilitate isolating environmental conditions external to the pipe segment from conditions within its pipe bore and, thus, fluid that flows therethrough. In particular, the tubing of a pipe segment may primarily be formed (e.g., implemented) to block fluid flow directly between the pipe bore of the pipe segment and its external environmental conditions, for example, in addition to providing thermal, pressure, and/or electrical isolation (e.g., insulation).

To facilitate improving fluid isolation, in some instances, the tubing of a pipe segment may include multiple layers. For example, the tubing of a pipe segment may include an internal pressure sheath (e.g., inner barrier) layer and an outer sheath (e.g., outer barrier) layer that are each formed (e.g., implemented) to run (e.g., span) the length of the pipe segment. In particular, the internal pressure sheath layer and the outer sheath layer may each be formed as a continuous layer of solid material, such as plastic, that runs the length of the pipe segment.

In some instances, the tubing of a pipe segment may additionally include one or more intermediate layers between its internal pressure sheath layer and its outer sheath layer. In particular, to facilitate improving its tensile strength and/or its hoop strength, in some instances, the intermediate layers of pipe segment tubing may include one or more reinforcement (e.g., pressure armor and/or tensile armor) layers, which each has one or more reinforcement strips formed from solid material that has a higher tensile strength and/or a higher linear elasticity modulus (e.g., stiffness) as compared to solid material that is used to form the internal pressure sheath layer and/or the outer sheath layer of the pipe segment tubing. For example, a reinforcement strip in a reinforcement layer of pipe segment tubing may be formed using metal, such as steel, while the internal pressure sheath layer and the outer sheath layer of the pipe segment tubing are formed using plastic, such as high-density polyethylene (HDPE). Additionally or alternatively, the intermediate layers of pipe segment tubing may include one or more tape layers, one or more intermediate sheath layers, one or more anti-wear layers, one or more insulation layers, or any combination thereof.

Furthermore, in some instances, a pipe segment may be deployed in an elevated pressure environment, for example, underwater in a subsea application. To facilitate improving its collapse and/or crush resistance, in some instances, the tubing of the pipe segment may additionally include a carcass layer under its internal pressure sheath layer. In other words, in such instances, the internal pressure sheath layer may surround the carcass layer and, thus, the carcass layer may be the innermost layer of the pipe segment tubing.

In any case, as described above, in a pipeline system, the tubing of a pipe segment may generally be secured and sealed in a pipe fitting. To facilitate securing pipe segment tubing therein, a pipe fitting may include a fitting body that defines a body (e.g., fitting) bore in which the internal pressure sheath layer and the carcass layer of the pipe segment tubing are to be disposed. However, in some instances, the pipe segment tubing may potentially pull out (e.g., separate) from the pipe fitting via its body bore. As such, to facilitate securing the pipe fitting to the pipe segment tubing, the fitting body of the pipe fitting may additionally define a potting cavity in which one or more reinforcement strips of the pipe segment tubing are to be anchored (e.g., secured). In other words, the fitting body may define the potting cavity circumferentially (e.g., concentrically) around the body bore.

Thus, to facilitate anchoring one or more reinforcement strips of the pipe segment tubing in its potting cavity, the fitting body of the pipe fitting may define the potting cavity such that its outer surface diameter is greater than the outer surface diameter of the body bore. As such, after fluid (e.g., liquid) potting material, such as epoxy, is flowed (e.g., filled) into the potting cavity and subsequently cured (e.g., hardened and/or solidified), a solid mass of cured potting material, which has a larger outer surface diameter than the body bore of the pipe fitting, may encase the portion of the reinforcement strip in the potting cavity and, thus, facilitate securing the pipe segment tubing in the pipe fitting. However, at least in some instances, the strength with which cured potting material in a pipe fitting bonds to (e.g., grabs onto) one or more reinforcement strips of pipe segment tubing may be a limiting factor in the strength with which the pipe segment tubing is secured in the pipe fitting and, thus, operational reliability of a pipeline system in which the pipe fitting and the pipe segment tubing are deployed, for example, due to the bond breaking under less force as compared to the force sufficient to break the cured potting material in the pipe fitting and/or a reinforcement strip of the pipe segment tubing.

Accordingly, to facilitate improving pipeline operational reliability, the present disclosure provides techniques for improving the strength with which a reinforcement strip of a pipe segment can be anchored within the potting cavity of a pipe fitting. As will be described in more detail below, a pipe fitting may generally include a fitting body, which defines a body bore and a potting cavity, as well as a fitting connector (e.g., flange), which is to be used to secure the pipe fitting to another pipeline component, such as another pipe fitting, a bore fluid source, or a bore fluid destination. In particular, the fitting body may include an inner fitting body, which is to be disposed between an internal pressure sheath layer and a reinforcement layer (e.g., one or more reinforcement strips) of pipe segment tubing, and an outer fitting body, which is to be disposed around the reinforcement layer of the pipe segment tubing.

In other words, the potting cavity of the pipe fitting in which one or more reinforcement strips of the pipe segment tubing is to be anchored (e.g., secured) may be defined between an inner surface of the outer fitting body and an outer surface of the inner fitting body. In particular, in some embodiments, the potting cavity of the pipe fitting may be defined with a wedge-shaped (e.g., conical) axial cross-section profile. In fact, at least in some instances, defining the potting cavity with a wedge-shaped axial cross-section profile may facilitate improving anchoring strength, for example, due to a force that tries to pull the pipe segment tubing out from the pipe fitting causing cured potting material in the potting cavity to be compressed against one or more reinforcement strips of the pipe segment tubing that are disposed in the potting cavity and/or the surfaces of the potting cavity.

To facilitate sealing pipe segment tubing therein, a pipe fitting may additionally include one or more fitting seals. In particular, in some embodiments, the pipe fitting may include an inner fitting seal, which is to be compressed between its inner fitting body, its fitting connector, and the internal pressure sheath layer of the pipe segment tubing. Additionally or alternatively, the pipe fitting may include an outer fitting seal, which is to be compressed between its outer fitting body, a fitting body collar, and the outer sheath layer of the pipe segment tubing.

Thus, to facilitate sealing and securing pipe segment tubing in the pipe fitting, the fitting body collar, the outer fitting seal, and the outer fitting body of the pipe fitting may be disposed (e.g., slid) around the pipe segment tubing. Additionally, the outer sheath layer of the pipe segment tubing may be cut back to expose a portion of one or more reinforcement layers of the pipe segment tubing. In some embodiments, a reinforcement strip in a reinforcement layer of pipe segment tubing may be formed at a target lay angle relative to the longitudinal axis of the pipe segment tubing to facilitate optimizing (e.g., balancing) the tensile strength and the hoop strength provided by the reinforcement strip. In fact, in some embodiments, reinforcement strips in different reinforcement layers of pipe segment tubing may have different target lay angles, for example, to enable a corresponding reinforcement layer to act as a pressure armor layer, a tensile armor layer, or both.

However, as described above, the outer fitting seal of the pipe fitting may be activated by pressing the outer fitting seal against the outer sheath layer of the pipe segment tubing. Additionally, as described above, in some embodiments, the outer sheath layer of pipe segment tubing may be formed from plastic, such as high-density polyethylene (HDPE). Thus, to facilitate separating (e.g., isolating) the sealing function provided by the outer fitting seal from the reinforcement function provided by a reinforcement layer (e.g., one or more reinforcement strips) of the pipe segment tubing, in some embodiments, a rigid reinforcement sleeve may be inserted and secured between a (e.g., non-cutback) portion of the outer sheath layer and a corresponding portion of the reinforcement layer.

Additionally, the inner fitting body of the pipe fitting may be disposed (e.g., wedged) between the internal pressure sheath layer and a reinforcement layer of the pipe segment tubing, thereby separating the reinforcement layer from the internal pressure sheath layer and, thus, exposing a portion of the internal pressure sheath layer. Furthermore, the inner fitting seal of the pipe fitting may be disposed (e.g., slid) around the exposed portion of the internal pressure sheath layer. The fitting connector, which is to be used to secure the pipe fitting to another pipeline component, may then be secured to the inner fitting body, for example, such that the inner fitting seal is compressed between the fitting connector, the inner fitting body, and the internal pressure sheath layer of the pipe segment tubing.

Furthermore, the outer fitting body of the pipe fitting may be slid over the exposed portion of the reinforcement layer (e.g., one or more reinforcement strips) to define a potting cavity in which fluid (e.g., liquid) potting material, such as epoxy, is to be flowed (e.g., filled) and subsequently cured (e.g., solidified and/or hardened). As described above, after curing, a solid mass of cured potting material may encase the portion of a reinforcement strip present in the potting cavity and, thus, facilitate anchoring the reinforcement strip in the pipe fitting. Additionally, the body collar of the pipe fitting may be secured to the outer fitting body, for example, to facilitate sealing the pipe segment tubing and/or the tubing cavity by compressing the outer fitting seal between the outer fitting body, the fitting body collar, and the outer sheath layer of the pipe segment tubing.

However, to facilitate improving the strength with which pipe segment tubing is secured to a pipe fitting, the structure of an exposed portion of one or more reinforcement strips in the pipe segment tubing may be modified (e.g., augmented and/or changed) before being anchored in the potting cavity of the pipe fitting. In particular, in some embodiments, the structure of a reinforcement strip may be modified at least in part by bending an exposed end of the reinforcement strip to form a hook (e.g., out-of-plane protrusion integrated with reinforcement strip). Thus, in such embodiments, after fluid potting material is flowed into the potting cavity and cured, solid potting material may be present directly between the hooked end of the reinforcement strip and an opening of the potting cavity, which, at least in some instances, may facilitate improving anchoring strength, for example, due to the hooked end having to break through the cured potting material in addition to its bond with the cured potting material before being pulled out from the potting cavity.

To facilitate implementing cured (e.g., solid) potting material between a reinforcement strip of pipe segment tubing and the portion of a body bore in a pipe fitting through which the pipe segment tubing could potentially pull out (e.g., separate) from the pipe fitting, in some embodiments, the structure of the reinforcement strip may additionally or alternatively be modified at least in part by forming one or more openings (e.g., holes) in an exposed portion of the reinforcement strip. In particular, in such embodiments, before being cured, fluid (e.g., liquid) potting material may flow into and around the one or more openings in the reinforcement strip. Thus, after curing, cured potting material may be present directly between the portion of the reinforcement strip that is behind the one or more openings and the opening of the potting cavity, which, at least in some instances, may facilitate improving anchoring strength, for example, due to the reinforcement strip having to break through the cured potting material in the one or more openings in addition to its bond with the cured potting material before being pulled out from the potting cavity.

To facilitate further improving anchoring strength, a pin may be inserted and secured in one or more openings that are formed in a reinforcement strip of pipe segment tubing, thereby effectively attaching an (e.g., discrete) out-of-plane protrusion to the reinforcement strip. In particular, before curing, fluid (e.g., liquid) potting material may flow around and cover the pin that is secured to the reinforcement strip. Thus, after curing, cured (e.g., solid) potting material may be present directly between the pin and the opening of the potting cavity. In other words, as compared to a reinforcement strip that does not include out-of-plane protrusions (e.g., hooks), securing one or more pins to a reinforcement strip of pipe segment tubing may facilitate increasing the amount of cured potting material that resists movement toward the portion of the body bore through which the pipe segment tubing could potentially pull out from the pipe fitting and, thus, further improving anchoring strength.

In fact, in some embodiments, a pin may be inserted and secured in openings formed in multiple different reinforcement strips of pipe segment tubing to facilitate securing the reinforcement strips to one another. In particular, in such embodiments, the pin may include a first pin head, which is to be inserted and secured in a first opening in a first reinforcement strip of the pipe segment tubing, and a second pin head, which is to be inserted and secured in a second opening in a second reinforcement strip of the pipe segment tubing. Additionally, in some such embodiments, the first pin head and the second pin head of the pin may be linearly aligned.

However, in other embodiments, the pin heads of a pin may not be linearly aligned, for example, to enable locating corresponding openings more centrally along the width of corresponding reinforcement strips. In particular, in some such embodiments, a first pin head and a second pin head of the pin may each extend out orthogonally from (e.g., perpendicular to) a pin body of the pin. In fact, in some such embodiments, the first pin head and the second pin head may extend out from the pin body in opposite directions, thereby enabling the pin to be disposed between adjacent reinforcement strips of pipe segment tubing such that the pin body facilitates maintaining spacing between the adjacent reinforcement strips.

Additionally, in some embodiments, a pin may be a collar pin, which includes multiple pin heads that extend out circumferentially from a ring pin body to facilitate securing a reinforcement layer in pipe segment tubing circumferentially to itself. In particular, in such embodiments, the collar pin may include a first pin head, which is to be inserted and secured in a first opening in a reinforcement layer, and a second pin head, which is to be inserted and secured in a second opening in the reinforcement layer, for example, in addition to a third pin head, which is to be inserted and secured in a third opening in the reinforcement layer, and so on. In fact, in some such embodiments, a collar pin may include multiple sets of pin heads that each correspond with a different reinforcement layer. For example, the collar pin may include a first set of pin heads, which extends out from an outer surface of its ring pin body and is to be secured in a corresponding set of openings in a first reinforcement layer of pipe segment tubing, and a second set of pin heads, which extends out from an inner surface of the ring pin body and is to be secured in a corresponding set of opening in a second reinforcement layer of the pipe segment tubing.

Moreover, to facilitate reducing component count and/or improving anchoring strength, in some embodiments, an opening may be formed in a reinforcement strip of pipe segment tubing to facilitate producing an out-of-plane protrusion that is integrated with (e.g., part of) the reinforcement strip. For example, three sides of a rectangle may be cut into the reinforcement strip to produce a flap of solid material that can be bent to form a hook along the length of the reinforcement strip. In this manner, as will be described in more detail below, the present disclosure provides techniques for improving the strength with which one or more reinforcement strips of pipe segment tubing can be anchored (e.g., secured) in a pipe fitting, which, at least in some instances, may facilitate improving the strength with which the pipe segment tubing is secured in the pipe fitting and, thus, operational reliability of a pipeline system in which the pipe segment tubing and the pipe fitting are deployed.

To help illustrate, an example of a pipeline system 10 is shown in FIG. 1. As in the depicted example, the pipeline system 10 may be coupled between a bore fluid source 12 and a bore fluid destination 14. Merely as an illustrative non-limiting example, the bore fluid source 12 may be a production well and the bore fluid destination 14 may be a fluid storage tank. In other instances, the bore fluid source 12 may be a first (e.g., lease facility) storage tank and the bore fluid destination 14 may be a second (e.g., refinery) storage tank.

In any case, the pipeline system 10 may generally be implemented and/or operated to facilitate transporting (e.g., conveying) fluid, such as gas and/or liquid, from the bore fluid source 12 to the bore fluid destination 14. In fact, in some embodiments, the pipeline system 10 may be used in many applications, including without limitation, both onshore and offshore oil and gas applications. For example, in such embodiments, the pipeline system 10 may be used to transport one or more hydrocarbons, such as crude oil, petroleum, natural gas, or any combination thereof. Additionally or alternatively, the pipeline system 10 may be used to transport one or more other types of fluid, such as produced water, fresh water, fracturing fluid, flowback fluid, carbon dioxide, or any combination thereof.

To facilitate transporting fluid from the bore fluid source 12 to the bore fluid destination 14, as in the depicted example, a pipeline system 10 may include one or more pipe fittings 18 and one or more pipe segments 20. For example, the depicted pipeline system 10 includes a first pipe segment 20A, a second pipe segment 20B, and an Nth pipe segment 20N. Additionally, the depicted pipeline system 10 includes a first pipe (e.g., end) fitting 18A, which couples the bore fluid source 12 to the first pipe segment 20A, a second pipe (e.g., midline) fitting 18B, which couples the first pipe segment 20A to the second pipe segment 20B, and an Nth pipe (e.g., end) fitting 18N, which couples the Nth pipe segment 20N to the bore fluid destination 14.

However, it should be appreciated that the depicted example is merely intended to be illustrative and not limiting. In particular, in other embodiments, a pipeline system 10 may include fewer than three (e.g., one or two) pipe segments 20 or more than three (e.g., four, five, or more) pipe segments 20. Additionally or alternatively, in other embodiments, a pipeline system 10 may include fewer than four (e.g., one, two, or three) pipe fittings 18 or more than four (e.g., five, six, or more) pipe fittings 18.

In any case, as described above, a pipe segment 20 generally includes tubing that may be used to convey (e.g., transfer and/or transport) water, gas, oil, and/or any other suitable type of fluid. The tubing of a pipe segment 20 may be made of any suitable type of material, such as plastic, metal, and/or a composite (e.g., fiber-reinforced composite) material. In fact, as will be described in more detail below, in some embodiments, the tubing of a pipe segment 20 may include multiple different layers. For example, the tubing of a pipe segment 20 may include a first high-density polyethylene layer, one or more reinforcement (e.g., steel strip) layers external to the first high-density polyethylene layer, and a second high-density polyethylene layer external to the one or more reinforcement layers.

Additionally, as in the depicted example, one or more (e.g., second and/or Nth) pipe segments 20 in a pipeline system 10 may be curved. To facilitate implementing a curve in a pipe segment 20, in some embodiments, the pipe segment 20 may be flexible, for example, such that the pipe segment 20 is spoolable on a reel and/or in a coil (e.g., during transport and/or before deployment of the pipe segment 20). In other words, in some embodiments, one or more pipe segments 20 in the pipeline system 10 may be a flexible pipe, such as a bonded flexible pipe, an unbonded flexible pipe, a flexible composite pipe (FCP), a thermoplastic composite pipe (TCP), or a reinforced thermoplastic pipe (RTP). In fact, at least in some instances, increasing the flexibility of a pipe segment 20 may facilitate improving deployment efficiency of a pipeline system 10, for example, by obviating a curved (e.g., elbow) pipe fitting 18 and/or enabling the pipe segment 20 to be transported to the pipeline system 10, deployed in the pipeline system 10, or both using a tighter spool.

To facilitate improving pipe flexibility, in some embodiments, the tubing of a pipe segment 20 that defines (e.g., encloses) its pipe bore may include annular gaps devoid of solid material. In fact, in some embodiments, an annular gap in the tubing of a pipe segment 20 may run (e.g., span) the length of the pipe segment 20 and, thus, define (e.g., enclose) a fluid conduit in the annulus of the tubing, which is separate from the pipe bore. In other words, in such embodiments, fluid may flow through a pipe segment 20 via its pipe bore, an annular gap (e.g., fluid conduit) within its tubing annulus, or both.

Figure 2:
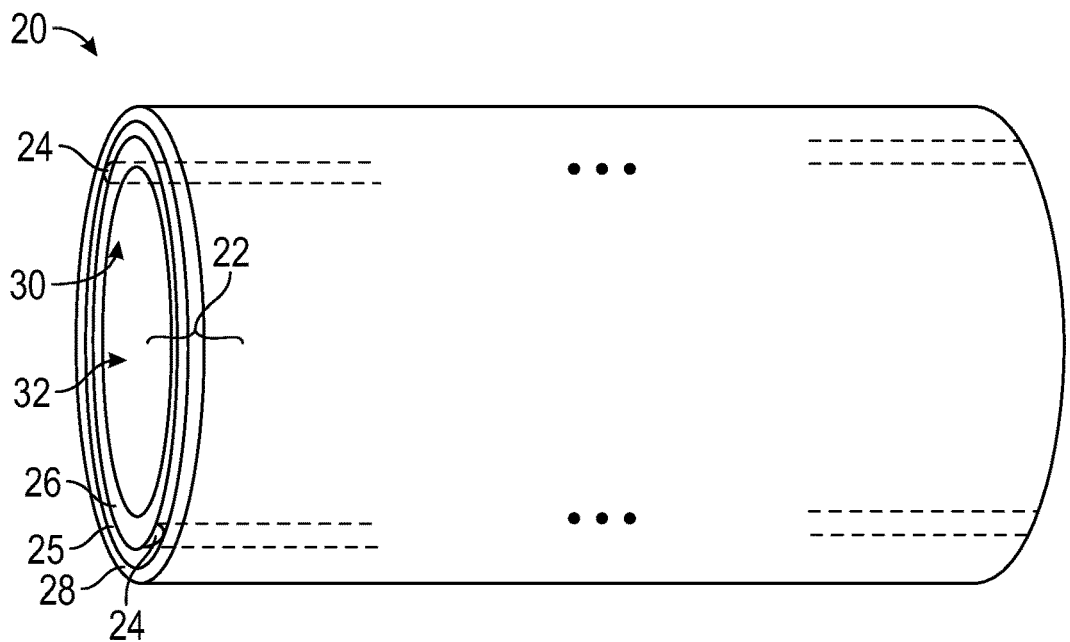
FIG. 2 is a side view of an example of a pipe segment of FIG. 1 that includes a pipe bore defined by its tubing as well as annular gaps defined within an annulus of its tubing, in accordance with an embodiment of the present disclosure.

To help illustrate, an example of a pipe segment 20, which includes tubing 22 with annular gaps (e.g., fluid conduits) 24 in a tubing annulus 25, is shown in FIG. 2. As depicted, the pipe segment tubing 22 has multiple layers including an internal pressure sheath (e.g., inner barrier) layer 26 and an outer sheath (e.g., outer barrier) layer 28. In some embodiments, the internal pressure sheath layer 26 and/or the outer sheath layer 28 of the pipe segment tubing 22 may be formed from composite material and/or plastic, such as high-density polyethylene (HDPE), raised temperature polyethylene (PE-RT), cross-linked polyethylene (XLPE), polyamide 11 (PA-11), polyamide 12 (PA-12), polyvinylidene difluoride (PVDF), or any combination thereof. Although a number of particular layers are depicted, it should be understood that the techniques described in the present disclosure may be broadly applicable to composite pipe body structures including two or more layers, for example, as distinguished from a rubber or plastic single-layer hose subject to vulcanization. In any case, as depicted, an inner surface 30 of the internal pressure sheath layer 26 defines (e.g., encloses) a pipe bore 32 through which fluid can flow, for example, to facilitate transporting fluid from a bore fluid source 12 to a bore fluid destination 14.

Additionally, as depicted, the annulus 25 of the pipe segment tubing 22 is between its internal pressure sheath layer 26 and its outer sheath layer 28. As will be described in more detail below, the tubing annulus 25 may include one or more intermediate layers of the pipe segment tubing 22. Furthermore, as depicted, annulus gaps 24 running along the length of the pipe segment 20 are defined (e.g., enclosed) in the tubing annulus 25. In other words, in some embodiments, the annular gaps 24 may be fluid conduits defined within the pipe segment tubing 22. In any case, as described above, an annular gap in pipe segment tubing 22 may be devoid of solid material. As such, pipe segment tubing 22 that includes one or more annulus gaps 24 therein may include thermoplastic or thermoset polymeric material disposed in the annular gaps. Moreover, to facilitate further improving pipe flexibility, in some embodiments, one or more layers in the tubing 22 of a pipe segment 20 may be unbonded from one or more other layers in the tubing 22 and, thus, the pipe segment 20 may be an unbonded pipe. Nevertheless, it should be appreciated that the techniques described in the present disclosure may additionally or alternatively be used with bonded pipe.

Moreover, it should be appreciated that the depicted example is merely intended to be illustrative and not limiting. In particular, in other embodiments, pipe segment tubing 22 may include fewer than two (e.g., one) or more than two (e.g., three, four, or more) annular gaps (e.g., fluid conduits) 24 defined in its tubing annulus 25. Additionally or alternatively, in other embodiments, an annular gap 24 defined in a tubing annulus 25 of a pipe segment 20 may run non-parallel to the pipe bore 32 of the pipe segment 20, for example, such that the annular gap 24 is skewed relative to the longitudinal axis of the pipe bore 32.

Figure 3:
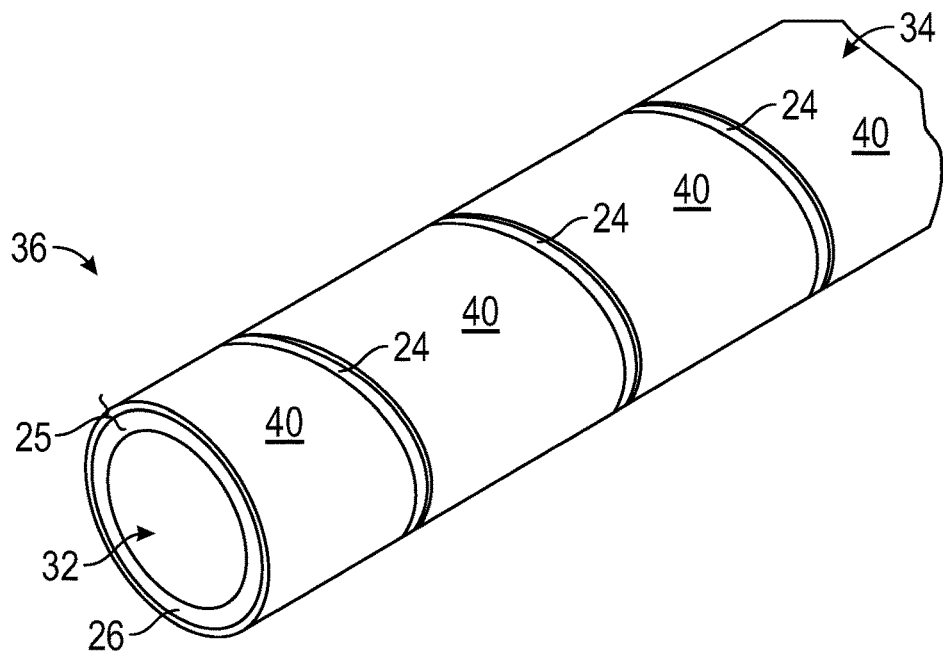
FIG. 3 is a perspective view of an example of a portion of the pipe segment of FIG. 2 that includes a reinforcement strip helically wrapped to define a helically shaped annular gap within the annulus of its tubing, in accordance with an embodiment of the present disclosure.

To help illustrate, an example of a portion 36 of a pipe segment 20, which includes an internal pressure sheath layer 26 and an intermediate layer—namely a reinforcement layer 34—included in a tubing annulus 25 of its pipe segment tubing 22, is shown in FIG. 3. However, it should be appreciated that the depicted example is merely intended to be illustrative and not limiting. In particular, in other embodiments, the intermediate layers of pipe segment tubing 22 may additionally or alternatively include one or more tape layers, one or more insulation layers one or more intermediate sheath layers, one or more anti-wear layers, or any combination thereof.

In any case, as depicted, the reinforcement layer 34 in pipe segment tubing 22 includes a reinforcement strip 40. To facilitate improving tensile strength and/or hoop strength of pipe segment tubing 22, in some embodiments, a reinforcement strip 40 in the pipe segment tubing 22 may be formed at least in part using solid material that has a higher tensile strength and/or a higher linear elasticity modulus (e.g., stiffness) than solid material that is used to implement the internal pressure sheath layer 26 and/or the outer sheath layer 28 of the pipe segment tubing. For example, the internal pressure sheath layer 26 may be formed from plastic, such as high-density polyethylene (HDPE), while the reinforcement strip 40 is formed from metal, such as carbon steel, stainless steel, duplex stainless steel, super duplex stainless steel, or any combination thereof. In other words, at least in some such embodiments, a reinforcement strip 40 of the pipe segment tubing 22 may be formed using electrically conductive material, which, at least in some instances, may enable communication of electrical (e.g., control and/or sensor) signals via the reinforcement strip 40. However, in other embodiments, one or more reinforcement strips 40 of pipe segment tubing 22 may additionally or alternatively be formed at least in part using a composite material and/or a polymer (e.g., plastic).

Additionally, as depicted, the reinforcement strip 40 is helically disposed (e.g., wound and/or wrapped) on the internal pressure sheath layer 26 such that gaps (e.g., openings) are left between adjacent windings to define an annular gap (e.g., fluid conduit) 24. In other words, in some embodiments, the reinforcement layer 34 may be formed at least in part by winding the reinforcement strip 40 around the internal pressure sheath layer 26 at a non-zero lay angle (e.g., fifty-four degrees) relative to the longitudinal axis of the pipe bore 32. As described above, a reinforcement strip 40 may generally have a target lay angle that facilitates optimizing (e.g., balancing) the tensile strength and the hoop strength provided by the reinforcement strip 40. In fact, in some embodiments, reinforcement strips 40 in different reinforcement layers 34 of pipe segment tubing 22 may have different target lay angles, for example, to enable a corresponding reinforcement layer 34 to act as a pressure armor layer, a tensile armor layer, or both. In any case, as depicted, the resulting annular gap 24 runs helically along the pipe segment 20, for example, such that the annular gap 24 is skewed fifty-four degrees relative to the longitudinal axis of the pipe bore 32.

However, it should again be appreciated that the depicted example is merely intended to be illustrative and not limiting. In particular, in some embodiments, one or more other intermediate layers, such as an anti-wear layer, may be formed between the internal pressure sheath layer 26 and a reinforcement layer 34 of pipe segment tubing 22. In other words, in some such embodiments, a reinforcement strip 40 of the reinforcement layer 34 may be disposed on another intermediate layer, for example, instead of directly on the internal pressure sheath layer 26 of the pipe segment tubing 22. Moreover, in other embodiments, a reinforcement layer 34 of pipe segment tubing 22 may include multiple reinforcement strips 40.

In any case, in some embodiments, an outer sheath layer 28 may be disposed directly over the depicted reinforcement layer 34 and, thus, cover and/or define (e.g., enclose) the depicted annular gap 24. However, in other embodiments, the tubing annulus 25 of pipe segment tubing 22 may include multiple (e.g., two, three, four, or more) reinforcement layers 34. In other words, in such embodiments, one or more other reinforcement layers 34 may be disposed over the depicted reinforcement layer 34. In fact, in some such embodiments, the reinforcement strips 40 in the one or more other reinforcement layers 34 may also each be helically disposed such that there are annular gaps (e.g., fluid conduits) 24 between adjacent windings.

For example, a first other reinforcement strip 40 of a first other reinforcement layer 34 may be helically disposed on the depicted reinforcement strip 40 using the same non-zero lay angle as the depicted reinforcement strip 40 to cover (e.g., enclose) the depicted annular gap 24 and to define another annular gap 24 in the first other reinforcement layer 34. Additionally, a second other reinforcement strip 40 of a second other reinforcement layer 34 may be helically disposed on the first other reinforcement strip 40 using another non-zero lay angle, which is the inverse of the non-zero lay angle of the depicted reinforcement strip 40, to define another annular gap 24 in the second other reinforcement layer 34. Furthermore, a third other reinforcement strip 40 of a third other reinforcement layer 34 may be helically disposed on the second other reinforcement strip 40 using the same non-zero lay angle as the second other reinforcement strip 40 to cover the other annular gap 24 in the second other reinforcement layer 34 and to define another annular gap 24 in the third other reinforcement layer 34. In some embodiments, an outer sheath layer 28 may be disposed over the third other reinforcement layer 34 and, thus, cover (e.g., enclose) the other annular gap 24 in the third other reinforcement layer 34.

In any case, as described above, in some instances, a pipe segment 20 may be deployed in an elevated pressure environment, for example, underwater in a subsea application. To facilitate improving the collapse and/or crush resistance of its tubing 22, a carcass layer may be disposed under the internal pressure sheath layer 26 of the pipe segment 20. In other words, in such instances, the internal pressure sheath layer 26 may be disposed around the carcass layer and, thus, the carcass layer may be the innermost layer of the pipe segment tubing 22.

Figure 4:
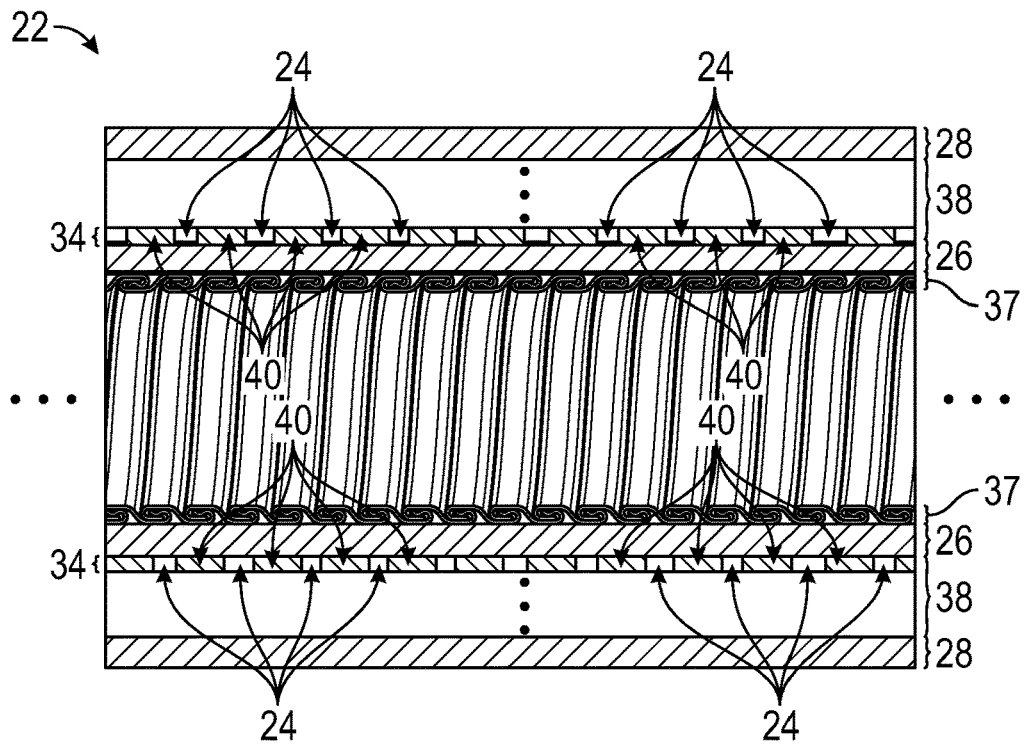
FIG. 4 is an axial cross-section profile of an example of a pipe segment that includes a carcass layer, in accordance with an embodiment of the present disclosure.

To help illustrate, an example of pipe segment tubing 22 that includes a carcass layer 37 is shown in FIG. 4. To facilitate improving collapse and/or crush resistance, in some embodiments, the carcass layer 37 may be formed from metal, such as carbon steel, stainless steel, duplex stainless steel, super duplex stainless steel, or any combination thereof. Additionally, as depicted, the carcass layer 37 is an interlocked layer in the pipe segment tubing 22.

In addition to the carcass layer 37, as depicted, the pipe segment tubing 22 includes an internal pressure sheath layer 26 and an outer sheath layer 28. Furthermore, as depicted, the pipe segment tubing 22 includes intermediate layers 38 between the internal pressure sheath layer 26 and the outer sheath layer 28. In particular, as depicted, the intermediate layers 38 includes at least a reinforcement layer 34 with one or more reinforcement strips 40 that define one or more annular gaps (e.g., fluid conduits) 24 therethrough.

However, it should be appreciated that the depicted example is merely intended to be illustrative and not limiting. In particular, as mentioned above, in some embodiments, the intermediate layers 38 of pipe segment tubing 22 may additionally or alternatively include one or more tape layers, one or more intermediate sheath layers, one or more anti-wear layers, one or more insulation layers, or any combination thereof. Additionally, as described above, in some embodiments, pipe segment tubing 22 may include multiple reinforcement layers 34, which each include one or more reinforcement strips 40. In any case, as described above, in a pipeline system 10, the tubing 22 of a pipe segment 20 may generally be secured and sealed in a pipe fitting 18.

Figure 5:
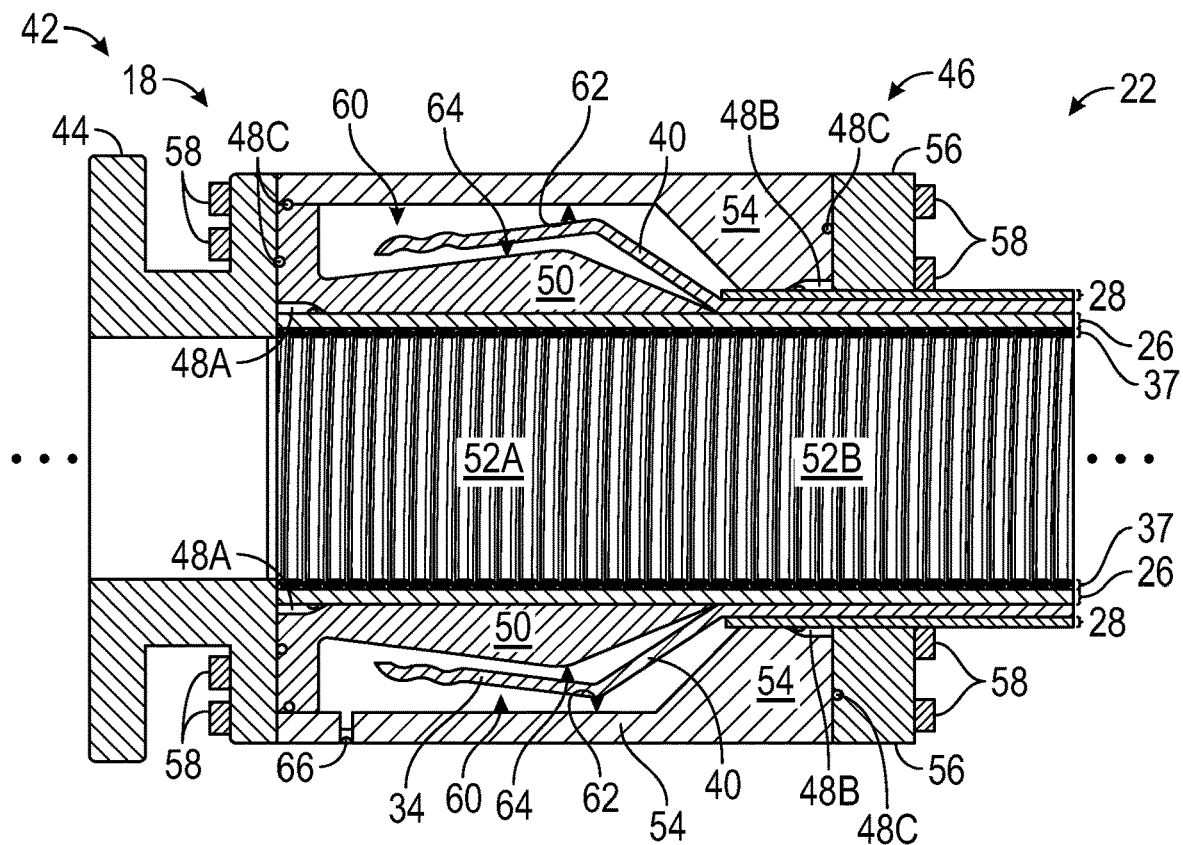
FIG. 5 is an axial cross-section profile of an example of a portion of the pipeline system of FIG. 1 that includes a pipe fitting and the pipe segment of FIG. 4, in accordance with an embodiment of the present disclosure.

To help illustrate, an example of a portion 42 of a pipeline system 10, which includes a pipe fitting 18 and pipe segment tubing 22, is shown in FIG. 5. As depicted, the pipe fitting 18 includes a fitting connector (e.g., flange) 44, which may be used to secure the pipe fitting 18 to another pipeline component, a fitting body 46, and fitting seals 48—namely an inner (e.g., first) fitting seal 48A, an outer (e.g., second) fitting seal 48B, and face seals 48C. In particular, as depicted, the fitting body 46 includes an inner fitting body 50, which defines an inner body (e.g., fitting) bore 52A in which the internal pressure sheath layer 26 and the carcass layer 37 of the pipe segment tubing 22 are disposed, as well as an outer fitting body 54 and a fitting body collar 56, which define an outer body (e.g., fitting) bore 52B through which the pipe segment tubing 22 could potentially pull out (e.g., separate) from the pipe fitting 18.

To facilitate securing the fitting connector 44 to the fitting body 46 as well as securing the fitting body collar 56 to the outer fitting body 54, in the depicted example, the pipe fitting 18 includes threaded fasteners 58, such as bolts. In particular, in some embodiments, the fitting connector 44 may be secured to the inner fitting body 50 such that the inner fitting seal 48A is compressed between the fitting connector 44, the inner fitting body 50, and the internal pressure sheath layer 26 of the pipe segment tubing 22 and a face seal 48C is compressed between the fitting connector 44 and the inner fitting body 50. Additionally, in some embodiments, the fitting body collar 56 may be secured to the outer fitting body 54 such that the outer fitting seal 48B is compressed between the fitting body collar 56, the outer fitting body 54, and the outer sheath layer 28 of the pipe segment tubing 22 and a face seal 48C is compressed between the outer fitting body 54 and the fitting body collar 56. Furthermore, in some embodiments, the outer fitting body 54 may be secured to the fitting connector 44 circumferentially around the inner fitting body 50 such that a face seal 48C is compressed between the outer fitting body 54 and the inner fitting body 50.

Moreover, as depicted, when the outer fitting body 54 is disposed around the inner fitting body 50, a potting cavity 60 in which one or more reinforcement strips 40 of the pipe segment tubing 22 are to be anchored is defined between an inner surface 62 of the outer fitting body 54 and an outer surface 64 of the inner fitting body 50. In particular, since a reinforcement strip 40 of the pipe segment tubing 22 is disposed around its internal pressure sheath layer 26, as depicted, the potting cavity 60 is formed circumferentially (e.g., concentrically) around the body bore (i.e., inner body bore 52A and outer body bore 52B) of the pipe fitting 18. Additionally, as depicted, the fitting body 46 is formed such that the outer surface diameter of the potting cavity 60 is greater than the outer surface diameter of the outer body bore 52B. Thus, to facilitate anchoring a reinforcement strip 40 of the pipe segment tubing 22 therein, fluid (e.g., liquid) potting material, such as epoxy, may be flowed (e.g., filled) into the potting cavity 60 and then cured (e.g., hardened and/or solidified). To facilitate flowing fluid potting material into the potting cavity 60, in the depicted example, a potting material port 66 fluidly coupled to the potting cavity 60 is formed in the outer fitting body 54.

After curing, a solid mass of cured potting material may encase the portion of one or more reinforcement strips 40 present in the potting cavity 60. In other words, the cured potting material may bond to (e.g., grab onto) the portion of the one or more reinforcement strips 40 present in the potting cavity 60, thereby facilitating anchoring of the one or more reinforcement strips 40 of the pipe segment tubing 22 in the potting cavity 60 of the pipe fitting 18 and, thus, securing the pipe segment tubing 22 in the pipe fitting 18. However, at least in some instances, the strength with which cured potting material bonds to a reinforcement strip 40 in pipe segment tubing 22 may be a limiting factor in the strength with which the pipe segment tubing 22 is secured in the pipe fitting 18 and, thus, operational reliability of a pipeline system 10 in which the pipe fitting 18 and the pipe segment tubing 22 are deployed, for example, due to the bond between the cured potting material and the reinforcement strip 40 breaking under less force than the force sufficient to break the cured potting material in the pipe fitting 18 and/or the reinforcement strip 40 in the pipe segment tubing 22.

Accordingly, to facilitate improving pipeline operational reliability, the present disclosure provides techniques to facilitate improving the strength with which a reinforcement strip 40 of pipe segment tubing 22 can be anchored in a pipe fitting 18. In particular, as will be described in more detail below, to facilitate improving anchoring strength, the structure of one or more reinforcement strips 40 of the pipe segment tubing 22 may be modified (e.g., changed and/or augmented) before the one or more reinforcement strips 40 are anchored in the potting cavity 60 of the pipe fitting 18, for example, to enable cured (e.g., solid) potting material in the potting cavity 60 to retain the one or more reinforcement strips 40 without relying solely on a bond between the cured potting material and the one or more reinforcement strips 40. In other words, the techniques described in the present disclosure may facilitate improving anchoring strength at least in part by enabling cured potting material in a pipe fitting 18 to retain a reinforcement strip 40 of pipe segment tubing 22 even under a force that would otherwise break a bond between the cured potting material and the reinforcement strip 40.

Figure 6:
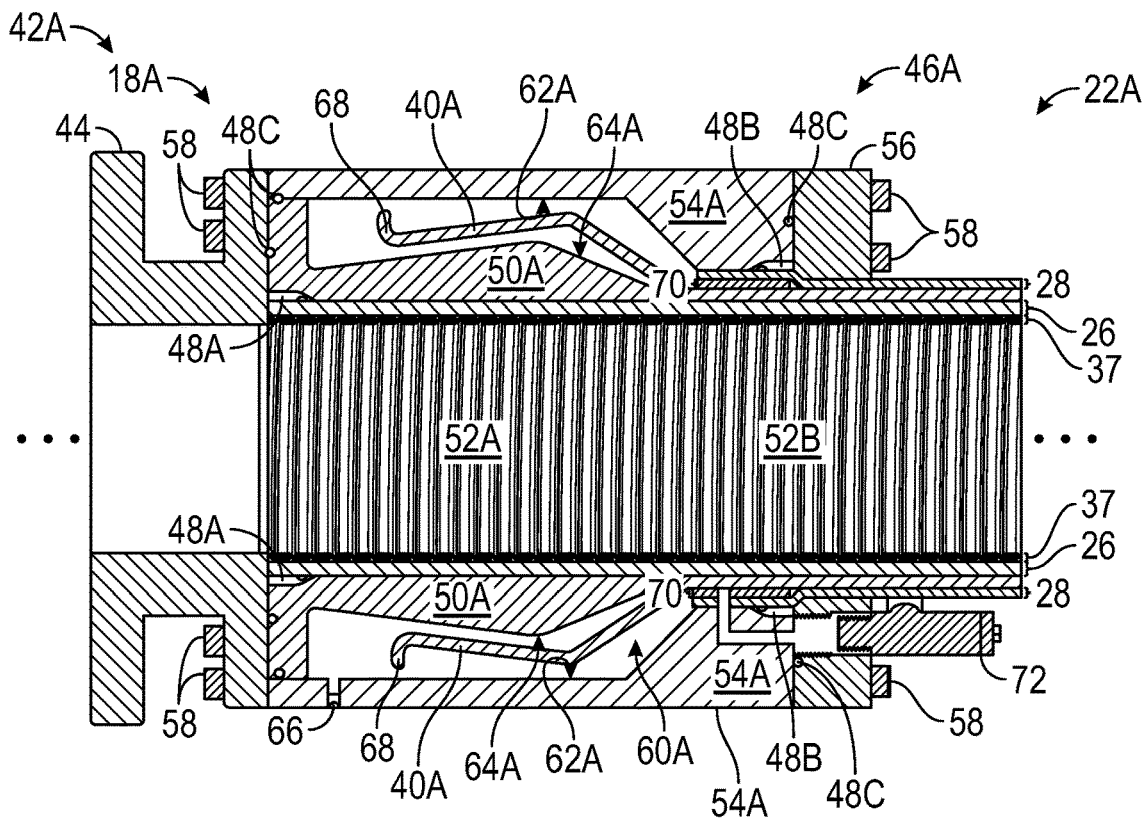
FIG. 6 is an axial cross-section profile of another example of a portion of the pipeline system of FIG. 1 that includes a pipe fitting and the pipe segment of FIG. 4 with hooked ends on its reinforcement strips, in accordance with an embodiment of the present disclosure.

To help illustrate, another example of a portion 42A of a pipeline system 10, which includes a pipe fitting 18A and pipe segment tubing 22A, is shown in FIG. 6. Similar to FIG. 5, the pipe fitting 18A of FIG. 6 includes a fitting connector 44, a fitting body 46A, threaded fasteners 58, and fitting seals 48—namely an inner fitting seal 48A, an outer fitting seal 48B, and face seals 48C. In particular, similar to FIG. 5, the fitting body 46A of FIG. 6 includes an inner fitting body 50A, which defines an inner body bore 52A in which the internal pressure sheath layer 26 and the carcass layer 37 of the pipe segment tubing 22A are disposed, as well as an outer fitting body 54A and a fitting body collar 56, which define an outer body bore 52B through which the pipe segment tubing 22A could potentially pull out (e.g., separate) from the pipe fitting 18A. Furthermore, similar to FIG. 5, the pipe fitting 18A of FIG. 6 includes a potting cavity 60A that is defined between the inner surface 62A of the outer fitting body 54A and the outer surface 64A of the inner fitting body 50A.

However, as depicted in FIG. 6, the reinforcement strips 40A of the pipe segment tubing 22A include hooked (e.g., curved and/or bent) ends 68. In particular, in some embodiments, a hooked end 68 may be formed in a reinforcement strip 40A of the pipe segment tubing 22A at least in part by cutting back the outer sheath layer 28 of the pipe segment tubing 22 to expose an end of the reinforcement strip 40A and bending the exposed end of the reinforcement strip 40A to form a hook (e.g., out-of-plane protrusion integrated with reinforcement strip 40A). Moreover, as in the example depicted in FIG. 6, the potting cavity 60A of a pipe fitting 18A may be defined with a wedge-shaped (e.g., conical) axial cross-section profile, which, at least in some instances, may facilitate improving anchoring strength, for example, due to a force that tries to pull the pipe segment tubing 22A out from the pipe fitting 18A causing cured potting material in the potting cavity 60A to be compressed against one or more reinforcement strips 40A of the pipe segment tubing 22A that are disposed in the potting cavity 60A and/or the surfaces 62A and 64A of the potting cavity 60A.

In any case, as described above, in some embodiments, a reinforcement strip 40 in pipe segment tubing 22 may generally have a target lay angle that facilitates optimizing (e.g., balancing) the tensile strength and the hoop strength provided by the reinforcement strip 40. Additionally, as described above, the outer fitting seal 48B of the pipe fitting 18A may be activated by compressing the outer fitting seal 48B against the outer sheath layer 28 of the pipe segment tubing 22A. Furthermore, as described above, in some embodiments, the outer sheath layer 28 of pipe segment tubing 22 may be formed from plastic, such as high-density polyethylene (HDPE), which may be relatively easy to deform.

Thus, to facilitate separating (e.g., isolating) the sealing function provided by the outer fitting seal 48B from the reinforcement function provided by the reinforcement strips 40A of the pipe segment tubing 22A, in some embodiments, a reinforcement sleeve 70 may be inserted and secured between a (e.g., non-cutback) portion of the outer sheath layer 28 and a corresponding portion of the reinforcement strips 40A. In particular, in some such embodiments, the reinforcement sleeve 70 may be formed using material that has a higher linear elasticity modulus (e.g., stiffness) than solid material that is used to form the outer sheath layer 28 of the pipe segment tubing 22A. For example, while the outer sheath layer 28 is formed using plastic, the reinforcement sleeve 70 may be formed at least in part using metal, such as carbon steel, stainless steel, duplex stainless steel, super duplex stainless steel, or any combination thereof.

Moreover, similar to FIG. 5, the pipe fitting 18A of FIG. 6 includes a potting material port 66 formed in its outer fitting body 54A. However, as in the example depicted in FIG. 6, the pipe fitting 18A may additionally include a vent port 72. In particular, as in the depicted example, the vent port 72 may be fluidly coupled to one or more annular gaps (e.g., fluid conduits) 24 defined in the reinforcement strips 40A and/or other intermediate layers 38 of the pipe segment tubing 22A (e.g., via an opening in the reinforcement sleeve 70 and an opening in the outer sheath layer 28 of the pipe segment tubing 22A) to enable fluid present therein to be vented out from the pipe fitting 18A.

In any case, as described above, as fluid (e.g., liquid) potting material is flowed into the potting cavity 60A, the fluid potting material may fill the open space around the portion of the reinforcement strips 40A present in the potting cavity 60A. Thus, after curing (e.g., hardening and/or solidifying), a solid mass of potting material may encase the portion of the reinforcement strips 40A in the potting cavity 60A. In particular, after curing, cured (e.g., solid) potting material may bond to the portion of a reinforcement strips 40A in the potting cavity 60A as well as be implemented directly between the hook end 68 of the reinforcement strips 40A and the outer body bore 52B through which the pipe segment tubing 22A could potentially pull out (e.g., separate) from the pipe fitting 18A. In other words, in this manner, a reinforcement strip 40A of the pipe segment tubing 22A may be anchored in the potting cavity 60A of the pipe fitting 18A due to its bond with cured potting material in the potting cavity 60A as well as the resistance the cured potting material exerts against movement of an out-of-plane protrusion—namely a hooked end 68 of the reinforcement strip 40A—directly therethrough, which, at least in some instances, may facilitate improving anchoring strength, for example, by enabling the cured potting material to retain the reinforcement strip 40A under a force that would otherwise break the bond between the cured potting material and the reinforcement strip 40A.

However, it should be appreciated that the depicted example is merely intended to be illustrative and not limiting. In particular, in other embodiments, fewer than two (e.g., one) or more than two (e.g., three, four, or more) reinforcement strips 40 of pipe segment tubing 22 may be anchored in the potting cavity 60 of a pipe fitting 18. Additionally, in other embodiments, a pipe fitting 18 may not include a vent port 72 and/or a reinforcement sleeve 70. Moreover, in other embodiments, the structure of a reinforcement strip 40 in pipe segment tubing 22 may additionally or alternatively be modified in a different manner to enable cured (e.g., solid) potting material to be formed directly between a portion of the reinforcement strip 40 in a potting cavity 60 of a pipe fitting 18 and an outer body bore 52B through which the pipe segment tubing 22 could potentially pull out (e.g., separate) from the pipe fitting 18.

Figure 7:
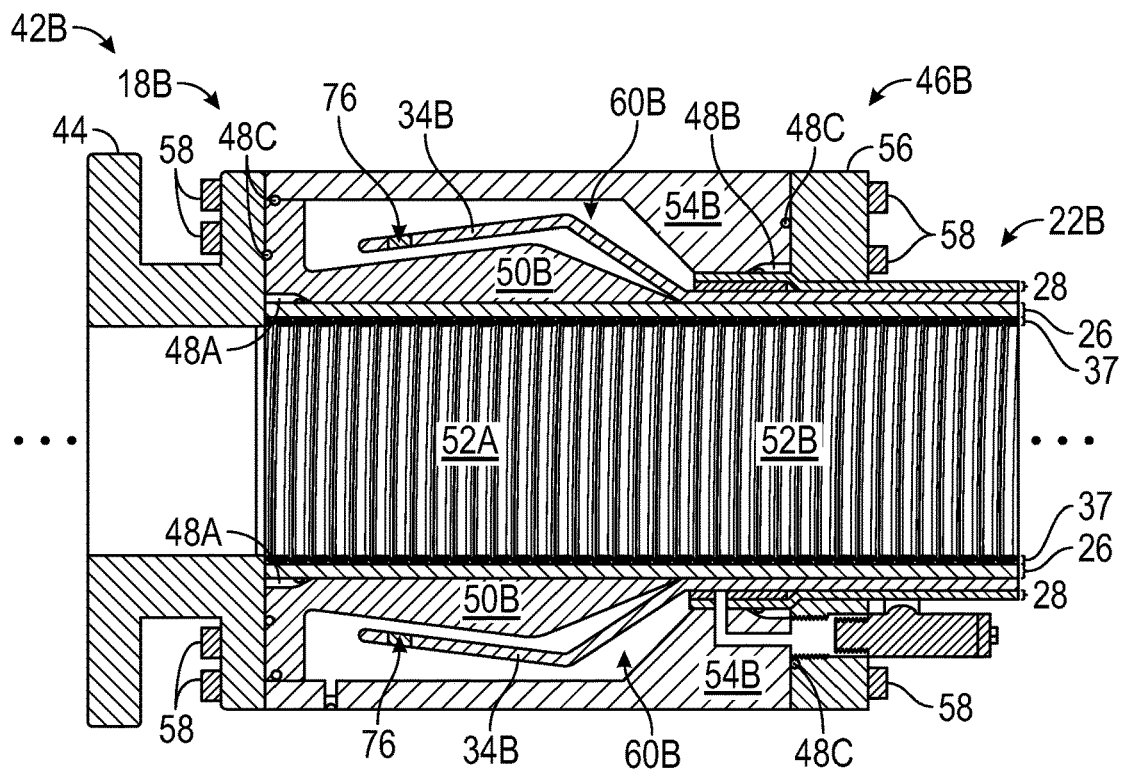
FIG. 7 is an axial cross-section profile of another example of a portion of the pipeline system of FIG. 1 that includes a pipe fitting and the pipe segment of FIG. 4 with openings in its reinforcement strips, in accordance with an embodiment of the present disclosure.

To help illustrate, another example of a portion 42B of a pipeline system 10, which includes a pipe fitting 18B and pipe segment tubing 22B, is shown in FIG. 7. Similar to FIG. 6, as depicted in FIG. 7, the pipe fitting 18B includes a fitting connector 44, a fitting body 46B that defines a potting cavity 60B, threaded fasteners 58, and fitting seals 48—namely an inner fitting seal 48A, an outer fitting seal 48B, and face seals 48C. In particular, similar to FIG. 6, as depicted in FIG. 7, the fitting body 46B includes an inner fitting body 50B, which defines an inner body bore 52A in which the internal pressure sheath layer 26 and the carcass layer 37 of the pipe segment tubing 22B are disposed, as well as an outer fitting body 54B and a fitting body collar 56, which define an outer body bore 52B through which the pipe segment tubing 22B could potentially pull out (e.g., separate) from the pipe fitting 18B. In fact, in some embodiments, the pipe fitting 18B of FIG. 7 may generally match the pipe fitting 18A of FIG. 6.

Figure 8:
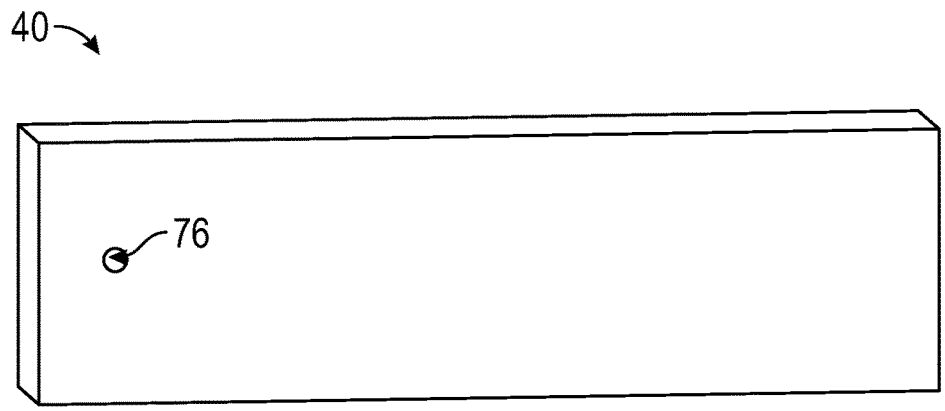
FIG. 8 is a top view of an example of a reinforcement strip in the pipe segment of FIG. 7 that includes an opening therethrough, in accordance with an embodiment of the present disclosure.

However, as depicted in FIG. 7, the reinforcement strips 40B of the pipe segment tubing 22B do not include hooked ends 68. To enable cured (e.g., solid) potting material to nevertheless be formed between a portion of a reinforcement strip 40B in the potting cavity 60B and the outer body bore 52B, as depicted, one or more openings (e.g., holes) 76 may be implemented (e.g., formed, drilled, and/or cut) in the reinforcement strips 40B. To help illustrate, an example of an opening 76 formed through a reinforcement strip 40 is shown in FIG. 8. However, it should be appreciated that the depicted example is merely intended to be illustrative and not limiting. In particular, in other embodiments, multiple (e.g., two, three, or more) openings 76 may be formed in a reinforcement strip 40 of pipe segment tubing 22.

In any case, returning to FIG. 7, when an opening 76 is formed in a reinforcement strip 40B of the pipe segment tubing 22B, fluid (e.g., liquid) potting material, such as epoxy, may fill the opening 76 as it is flowed into the potting cavity 60B. Thus, after curing, a solid mass of cured potting material may encase the portion of the reinforcement strips 40B in the potting cavity 60B. In particular, after curing, cured (e.g., solid) potting material may bond to the portion of a reinforcement strip 40B in the potting cavity 60B as well as be implemented within the opening 76 in the reinforcement strip 40 and, thus, directly between a portion of the reinforcement strip 40B behind the opening 76 and the outer body bore 52B through which the pipe segment tubing 22B could potentially pull out (e.g., separate) from the pipe fitting 18B. In other words, in this manner, a reinforcement strip 40B of the pipe segment tubing 22B may be anchored in the potting cavity 60B of the pipe fitting 18B due its bond with cured potting material in the potting cavity 60B as well as the resistance the cured potting material exerts against movement of the portion of the reinforcement strip 40 behind the opening 76 directly therethrough, which, at least in some instances, may facilitate improving anchoring strength, for example, by enabling the cured potting material to retain the reinforcement strip 40B under a force that would otherwise break the bond between the cured potting material and the reinforcement strip 40B.

However, it should be appreciated that the depicted example is merely intended to be illustrative and not limiting. In particular, in other embodiments, a reinforcement strip 40 of pipe segment tubing 22 may be implemented with one or more openings 76 as well as a hooked end 68. Additionally or alternatively, to facilitate further improving anchoring strength, in some embodiments, pins may be inserted and secured in corresponding openings 76 in one or more reinforcement strips 40 of pipe segment tubing 22.

Figure 9:
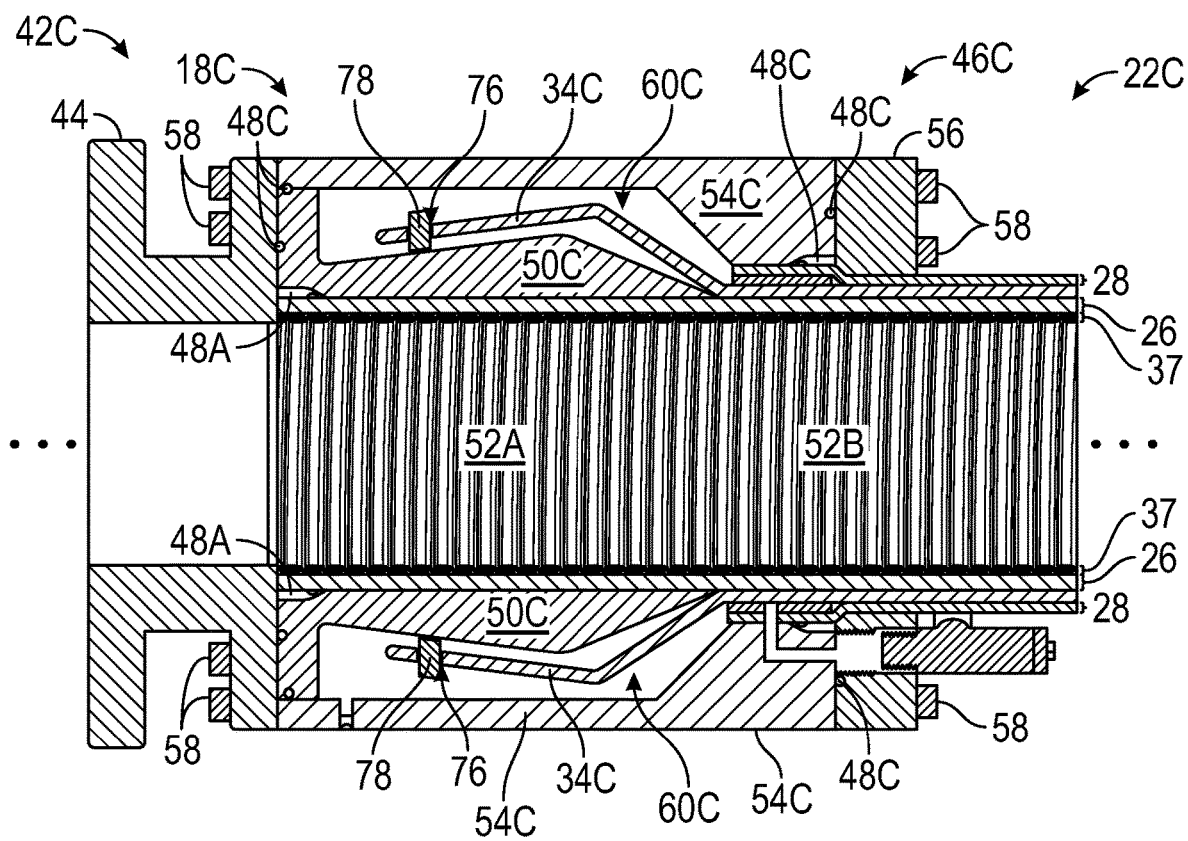
FIG. 9 is an axial cross-section profile of another example of a portion of the pipeline system of FIG. 1 that includes a pipe fitting and the pipe segment of FIG. 4 with pins secured in openings formed in its reinforcement strips, in accordance with an embodiment of the present disclosure.

To help illustrate, another example of a portion 42C of a pipeline system 10, which includes a pipe fitting 18C and pipe segment tubing 22C, is shown in FIG. 9. Similar to FIG. 6, as depicted in FIG. 9, the pipe fitting 18C includes a fitting connector 44, a fitting body 46C that defines a potting cavity 60C, threaded fasteners 58, and fitting seals 48—namely an inner fitting seal 48A, an outer fitting seal 48B, and face seals 48C. In particular, similar to FIG. 6, as depicted in FIG. 9, the fitting body 46C includes an inner fitting body 50C, which defines an inner body bore 52A in which the internal pressure sheath layer 26 and the carcass layer 37 of the pipe segment tubing 22B are disposed, as well as an outer fitting body 54C and a fitting body collar 56, which define an outer body bore 52B through which the pipe segment tubing 22C could potentially pull out (e.g., separate) from the pipe fitting 18C. In fact, in some embodiments, the pipe fitting 18C of FIG. 9 may generally match the pipe fitting 18A of FIG. 6.

However, as depicted in FIG. 9, pins 78 are secured in the openings 76 in the reinforcement strips 40C of the pipe segment tubing 22C, thereby effectively attaching out-of-plane protrusions to the reinforcement strips 40C. In some embodiments, a pin 78 to be secured in an opening 76 in a reinforcement strip 40C may be a tapered pin, a dowel pin, a cotter pin, a rivet, or the like. Additionally, as will be described in more detail below, in some embodiments, a pin 78 may be secured in one or more openings 76 in a single reinforcement strip 40C. However, in other embodiments, a pin 78 may be secured in openings 76 in multiple different reinforcement strips 40C.

Figure 10:
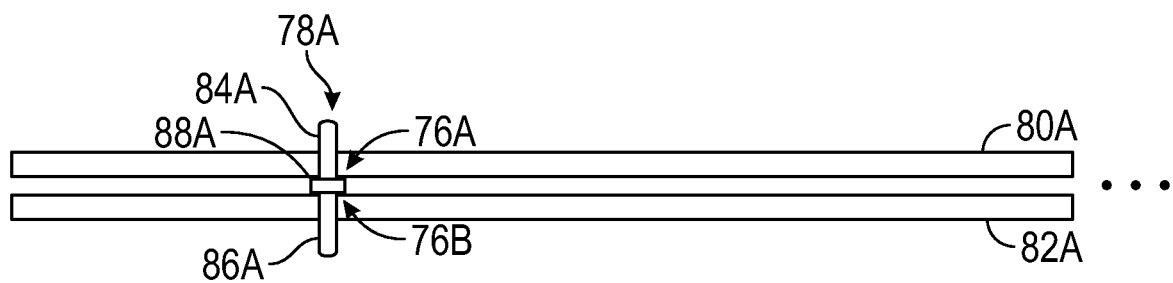
FIG. 10 is an axial cross-section profile of an example of a pin secured in openings in multiple reinforcement strips of pipe segment tubing, in accordance with an embodiment of the present disclosure.

To help illustrate, an example of a pin 78A secured in multiple reinforcement strips 40—namely a first reinforcement strip 80A and a second reinforcement strip 82A—is shown in FIG. 10. As depicted, the pin 78A include multiple pin shafts—namely a first pin shaft 84A, which is secured in a first opening 76A in the first reinforcement strip 80A such that it extends out from the first reinforcement strip 80A, and a second pin shaft 86A, which is secured in a second opening 76B in the second reinforcement strip 82A such that it extends out from the second reinforcement strip 82A. Additionally, as depicted, the pin 78A includes a pin body 88A that is coupled to (e.g., between) the first pin shaft 84A and the second pin shaft 86A and, thus, the pin 78A may facilitate securing the first reinforcement strip 80A and the second reinforcement strip 82A to one another.

In particular, as depicted, the diameter of the pin body 88A is greater than the diameter of the openings 76 in the first reinforcement strip 80A and the second reinforcement strip 82A. Accordingly, as in the depicted example, in some embodiments, the pin body 88A may remain between the first reinforcement strip 80A and the second reinforcement strip 82A. In other words, in addition to securing the first reinforcement strip 80A and the second reinforcement strip 82A to one another, in such embodiments, the pin 78A may facilitate maintaining spacing between the reinforcement strips 40, for example, to enable the reinforcement strips 40 to maintain and/or achieve corresponding target lay angles and, thus, facilitate improving tensile strength and/or hoop strength provided by the reinforcement strips 40.

However, it should be appreciated that the depicted example is merely intended to be illustrative and not limiting. In particular, in other embodiments, the same pin shaft of a pin 78 may be inserted and secured in openings 76 in multiple different reinforcement strips 40 of pipe segment tubing 22. Additionally or alternatively, in other embodiments, a pin 78 may be formed with a different shape, for example, such that its pin shafts are not linearly aligned.

Figure 11:
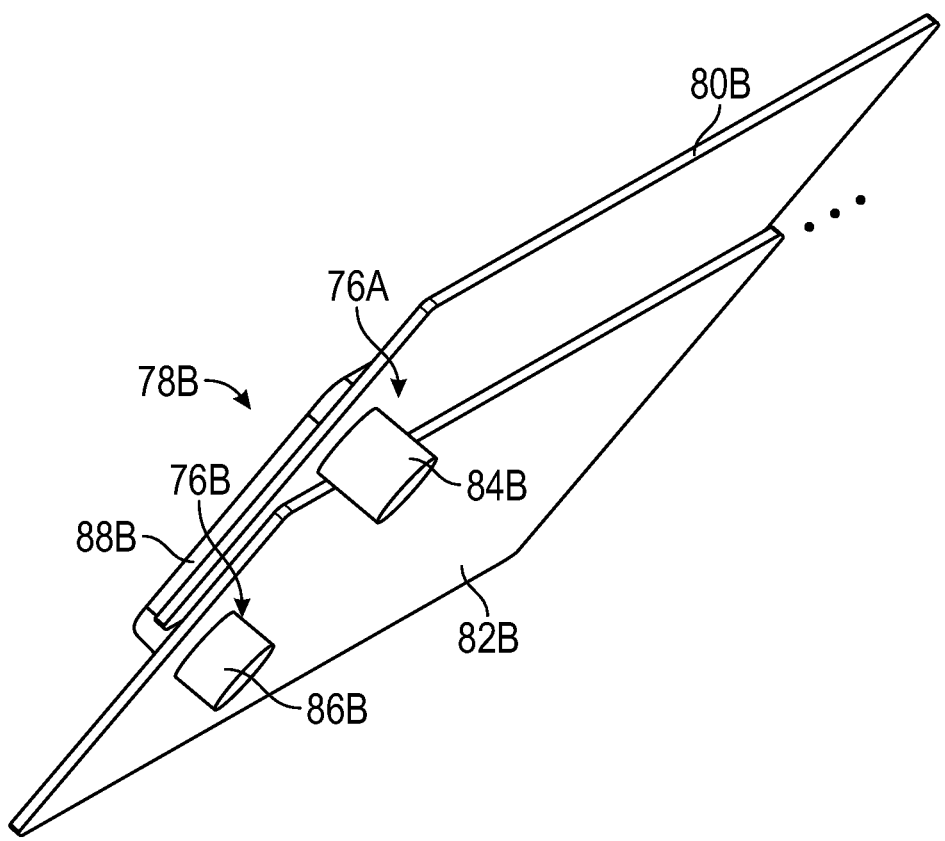
FIG. 11 is perspective view of another example of a pin secured in openings in multiple reinforcement strips of pipe segment tubing, in accordance with an embodiment of the present disclosure.

To help illustrate, another example of a pin 78B secured in multiple reinforcement strips 40—namely a first reinforcement strip 80B and a second reinforcement strip 82B—is shown in FIG. 11. Similar to FIG. 10, as depicted in FIG. 11, the pin 78B includes multiple pin shafts—namely a first pin shaft 84B, which secured in a first opening 76A in the first reinforcement strip 80B such that it extends out from the first reinforcement strip 80B, and a second pin shaft 86B, which is secured in a second opening 76B in the second reinforcement strip 82B such that it extends out from the second reinforcement strip 82B. Additionally, similar to FIG. 10, as depicted in FIG. 11, the pin 78B includes a pin body 88B that is coupled to the first pin shaft 84B and the second pin shaft 86B and, thus, the pin 78B may facilitate securing the first reinforcement strip 80B and the second reinforcement strip 82B to one another.

However, as depicted in FIG. 11, the first pin shaft 84A and the second pin shaft 86B of the pin 78B are not linearly aligned with one another and extend out from the pin body 88B in the same direction. Additionally, as depicted, the longitudinal axis of the first reinforcement strip 80B does not overlap (e.g., intersect) with the longitudinal axis of the second reinforcement strip 82B. As such, to enable a linearly aligned pin 78 (e.g., pin 78A) to be secured in the first reinforcement strip 80B and the second reinforcement strip 82B, corresponding openings 76 may be formed at less central locations along the widths of the reinforcement strips 40. Comparatively, the pin 78B in FIG. 11 may enable the openings 76 to be formed at more central locations along the widths of the first reinforcement strip 80B and the second reinforcement strip 82B, which, at least in some instances, may facilitate reducing the effect the openings 76 have on structural integrity of the reinforcement strips 40.

However, it should be appreciated that the depicted example is merely intended to be illustrative and not limiting. In particular, as will be described in more detail below, in other embodiments, a pin 78 may include more than two (e.g., three, four, or more) pin shafts. Additionally or alternatively, in other embodiments, a pin 78 that includes non-linearly aligned pin shafts may be formed with a different shape.

Figure 12:
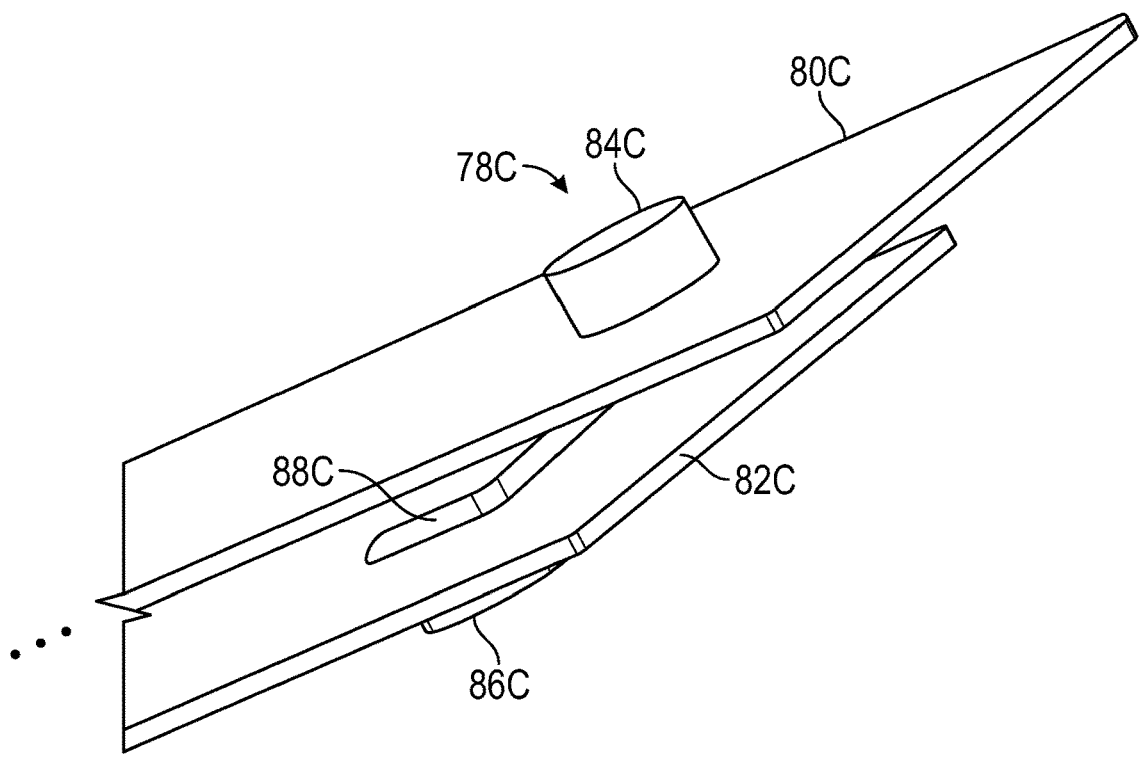
FIG. 12 is a perspective view of another example of a pin secured in openings formed in multiple reinforcement strips of pipe segment tubing, in accordance with an embodiment of the present disclosure.

To help illustrate, another example of a pin 78C secured in multiple reinforcement strips 40—namely a first reinforcement strip 80C and a second reinforcement strip 82C—is shown in FIG. 12. Similar to FIG. 10, as depicted in FIG. 12, the pin 78C includes multiple pin shafts—namely a first pin shaft 84C, which is secured in a first opening 76A in the first reinforcement strip 80C such that it extends out from the first reinforcement strip 80C, and a second pin shaft 86C, which is secured in a second opening 76B in the second reinforcement strip 82C such that it extends out from the second reinforcement strip 82C. Additionally, similar to FIG. 10, as depicted in FIG. 12, the pin 78C includes a pin body 88C that is coupled to the first pin shaft 8CB and the second pin shaft 86C and, thus, the pin 78C may facilitate securing the first reinforcement strip 80C and the second reinforcement strip 82C to one another.

However, similar to FIG. 11, as depicted in FIG. 12, the first pin shaft 84C and the second pin shaft 86C of the pin 78C are not linearly aligned with one another. In particular, similar to FIG. 11, as depicted in FIG. 12, the longitudinal axis of the first reinforcement strip 80C and the longitudinal axis of the second reinforcement strip 82C do not overlap (e.g., intersect). Thus, similar to FIG. 11, the pin 78C in FIG. 12 may enable the openings 76 to be formed at more central locations along the widths of the first reinforcement strip 80C and the second reinforcement strip 82C, which, at least in some instances, may facilitate reducing the effect the openings 76 have on structural integrity of the reinforcement strips 40.

However, as depicted in FIG. 12, the first pin shaft 84C and the second pin shaft 86C also extend out from the pin body 88C in different (e.g., opposite) directions. Thus, as in the depicted example, in some embodiments, the pin 78C may be secured to the first reinforcement strip 80C and the second reinforcement strip 82C such that its pin body 88C is disposed between the reinforcement strips 40. In other words, in addition to securing the first reinforcement strip 80C and the second reinforcement strip 82C to one another, in such embodiments, the pin 78C may facilitate maintaining spacing between the reinforcement strips 40, for example, to enable the reinforcement strips 40 to maintain and/or achieve corresponding target lay angles and, thus, facilitate improving tensile strength and/or hoop strength provided by the reinforcement strips 40.

Nevertheless, it should be appreciated that the depicted example is merely intended to be illustrative and not limiting. In particular, in other embodiments, a pin 78 may include more than two (e.g., three, four, or more) pin shafts. Additionally or alternatively, in other embodiments, the pin body 88 of a pin 78 may be formed with a different shape, such as a ring.

Figure 13:
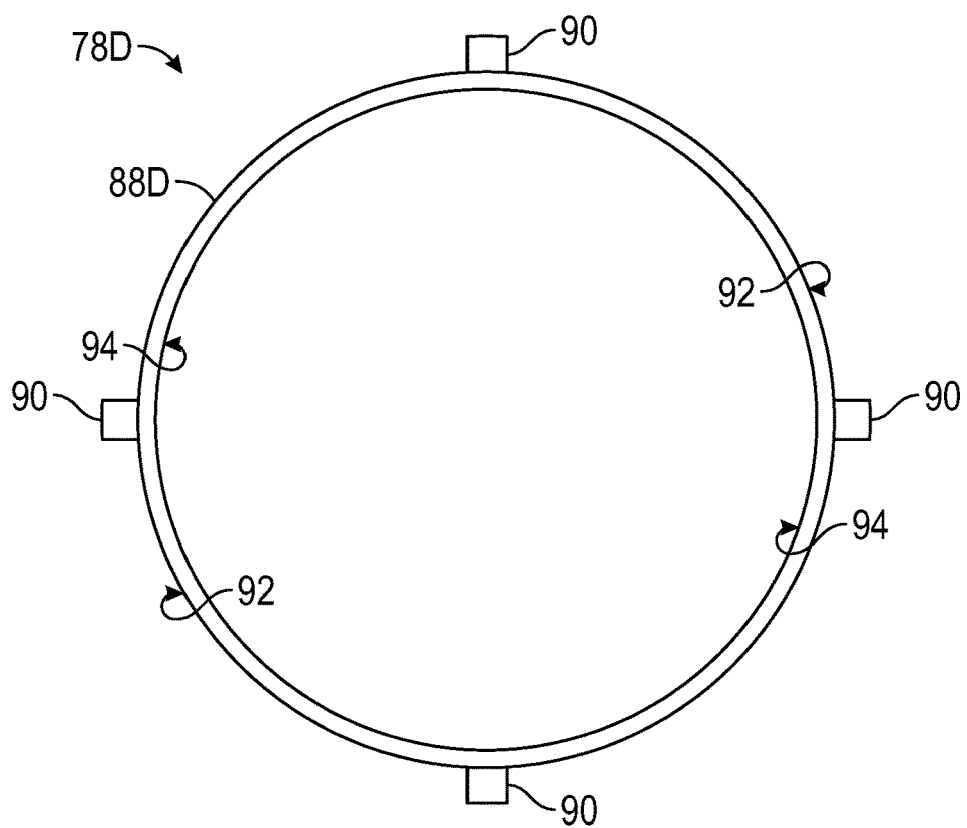
FIG. 13 is an axial view of an example of a collar pin that is to be secured in openings in a reinforcement strip of pipe segment tubing, in accordance with an embodiment of the present disclosure.

To help illustrate, another example of a pin 78—namely a collar pin 78D—is shown in FIG. 13. As depicted, the collar pin 78D has a ring pin body 88D and a pin shaft set 90, which includes multiple pin shafts. In particular, in the depicted example, each pin shaft in the pin shaft set 90 extends out from an outer surface 92 of the ring pin body 88D.

Additionally, in some embodiments, each pin shaft in the pin shaft set 90 may be inserted and secured in a corresponding opening 76 in a reinforcement layer 34 of pipe segment tubing 22. For example, a first pin shaft of the pin shaft set 90 may be secured in a first opening 76 in the reinforcement layer 34 such that it extends out from the reinforcement strip 40, a second pin shaft of the pin shaft set 90 may be secured in a second opening 76 in the reinforcement layer 34 such that it extends out from the reinforcement layer 34, and so on. In other words, in such embodiments, the collar pin 78D may facilitate securing the reinforcement layer 34 circumferentially to itself, which, at least in some instances, may facilitate maintaining and/or achieving a corresponding target lay angle and, thus, improving tensile strength and/or hoop strength provided by the reinforcement layer 34.

However, it should be appreciated that the depicted example is merely intended to be illustrative and not limiting. In particular, in other embodiments, a pin shaft set 90 may include fewer than four (e.g., two or three) or more than four (e.g., five, six, or more) pin shafts. Additionally or alternatively, in other embodiments, a pin shaft set 90 may extend out from an inner surface 94 of a corresponding pin body 88. Furthermore, in other embodiments, a pin 78 may include multiple pin shaft sets 90, for example, which are each to be secured to a different reinforcement layer 34 of pipe segment tubing 22.

Figure 14:
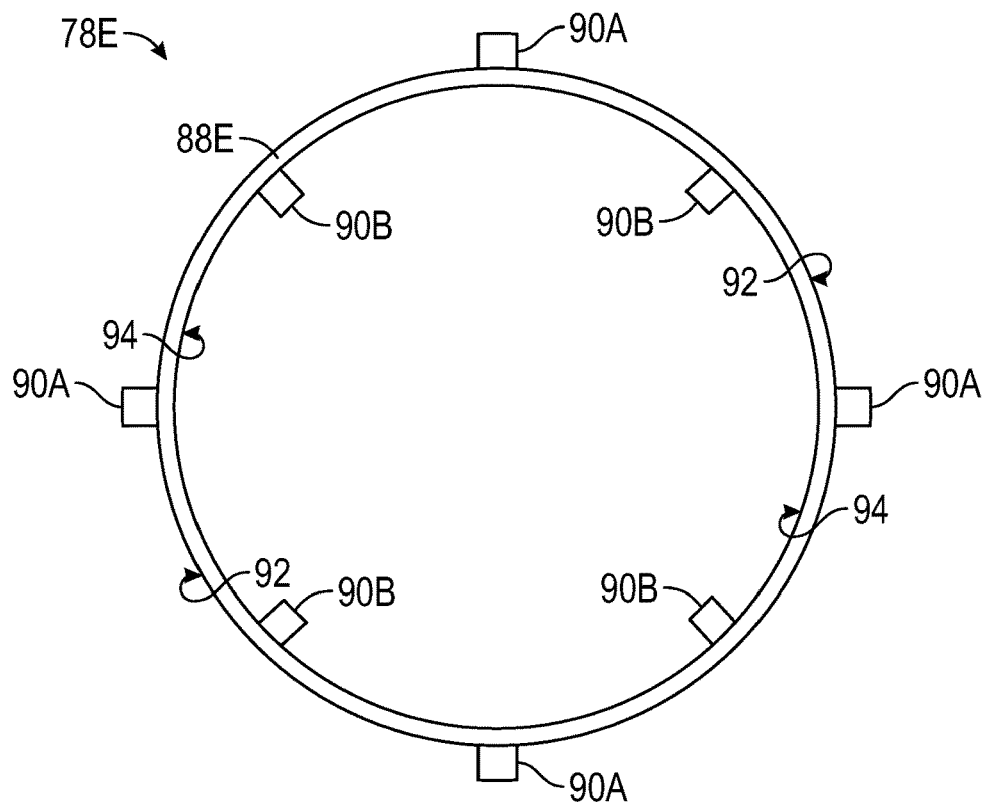
FIG. 14 is an axial view of another example of a collar pin that is to be secured in openings formed in multiple reinforcement strips of pipe segment tubing, in accordance with an embodiment of the present disclosure.

To help illustrate, another example of a pin 78—namely a collar pin 78E—is shown in FIG. 14. Similar to FIG. 13, as depicted in FIG. 14, the collar pin 78E has a ring pin body 88E and a pin shaft set 90—namely a first pin shaft set 90A—that includes multiple pin shafts. In particular, similar to FIG. 13, as depicted in FIG. 14, each pin shaft in the first pin shaft set 90A extends out from an outer surface 92 of the ring pin body 88E.

However, as depicted in FIG. 14, the collar pin 78E additionally has a second pin shaft set 90B, which includes multiple pin shafts that each extend out from an inner surface 94 of the ring pin body 88E. In some embodiments, each pin shaft of the first pin shaft set 90A may be secured in a corresponding openings 76 in a first (e.g., outer) reinforcement layer 34 of pipe segment tubing 22 such that it extends out from the first reinforcement layer 34 while each pin shaft of the second pin shaft set 90B may be secured in corresponding openings 76 in a second (e.g., inner) reinforcement layer 34 of the pipe segment tubing 22 such that it extends out from the second reinforcement layer 34. In other words, in addition to circumferentially securing the first reinforcement layer 34 to itself and circumferentially securing the second reinforcement layer 34 to itself, in such embodiments, the collar pin 78E may facilitate securing the reinforcement layers 34 circumferentially to one another, which, at least in some instances, may facilitate maintaining and/or achieving corresponding target lay angles and, thus, improving tensile strength and/or hoop strength provided by the reinforcement layers 34.

In any case, as described above, a pin shaft of a pin 78 may be securing in an opening 76 in a reinforcement strip 40 of pipe segment tubing 22 such that the pin shaft extends out from the reinforcement strip 40, thereby effectively attaching an out-of-plane protrusion to the reinforcement layer. Thus, returning to FIG. 9, as fluid (e.g., liquid) potting material, such as epoxy, is flowed into the potting cavity 60C of the pipe fitting 18C, the fluid potting material may fill the space around the pins 78 that are secured to the reinforcement strips 40C of the pipe segment tubing 22C. As such, after curing, a solid mass of cured potting material may encase the portion of the reinforcement strips 40C in the potting cavity 60C as well as the pins 78 secured to the reinforcement strips 40C. In other words, in this manner, a reinforcement strip 40C of the pipe segment tubing 22C may be anchored in the potting cavity 60C of the pipe fitting 18C due to its bond with cured potting material in the potting cavity 60C as well as the resistance the cured potting material exerts against movement of an out-of-plane protrusion—namely a pin 78 attached to the reinforcement strip 40C—directly therethrough, which, at least in some instances, may facilitate improving anchoring strength, for example, by enabling the cured potting material to retain the reinforcement strip 40C under a force that would otherwise break the bond between the cured potting material and the reinforcement strip 40C.

However, it should be appreciated that the depicted example is merely intended to be illustrative and not limiting. In particular, in other embodiments, multiple different pins 78 may be secured to a reinforcement strip 40 of pipe segment tubing 22. Additionally or alternatively, in other embodiments, a reinforcement strip 40 of pipe segment tubing 22 may have one or more pins 78 secured thereto as well as an integrated out-of-plane protrusion, such as a hooked end 68. However, in some embodiments, a reinforcement strip 40 of pipe segment tubing 22 may include an integrated out-of-plane protrusion other than a hooked end 68.

Figure 15:
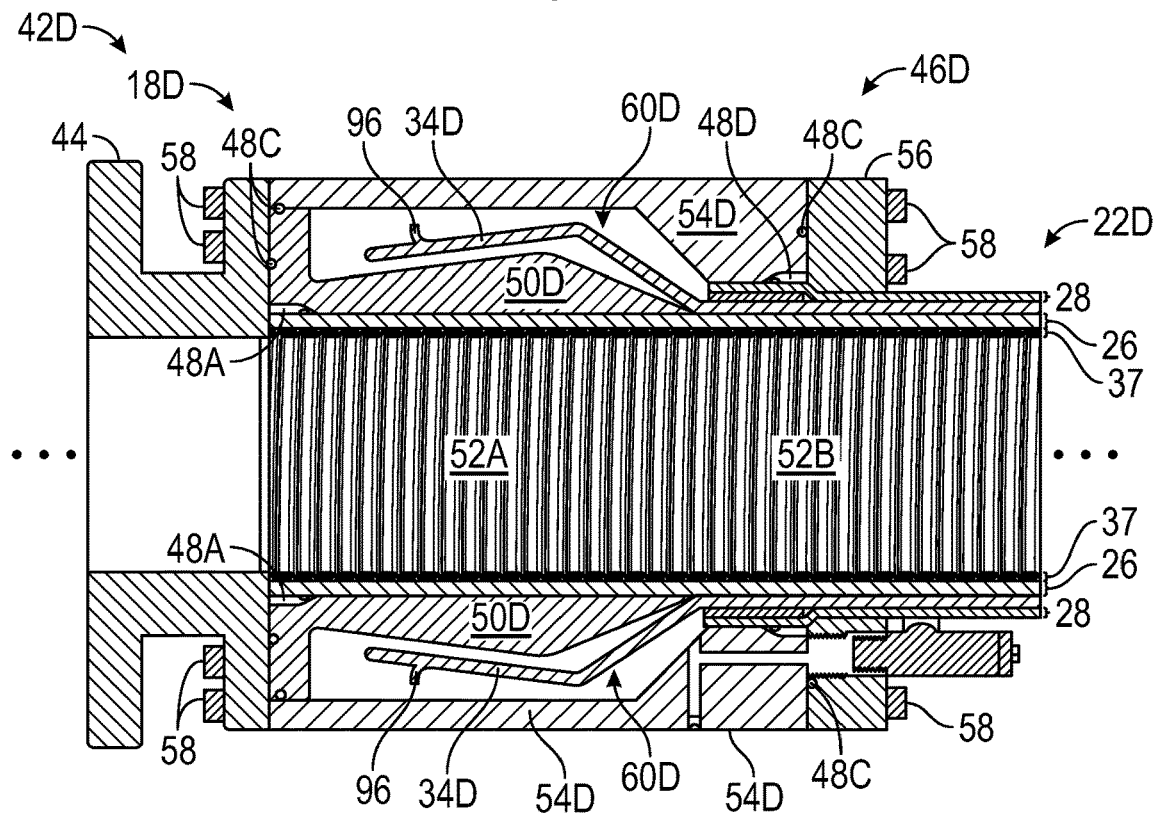
FIG. 15 is an axial cross-section profile of another example of a portion of the pipeline system of FIG. 1 that includes a pipe fitting and the pipe segment of FIG. 4 with integrated out-of-plane protrusions in its reinforcement strips, in accordance with an embodiment of the present disclosure.

To help illustrate, another example of a portion 42D of a pipeline system 10, which includes a pipe fitting 18D and pipe segment tubing 22D, is shown in FIG. 15. Similar to FIG. 6, as depicted in FIG. 15, the pipe fitting 18D includes a fitting connector 44, a fitting body 46D that defines a potting cavity 60D, threaded fasteners 58, and fitting seals 48—namely an inner fitting seal 48A, an outer fitting seal 48B, and face seals 48C. In particular, similar to FIG. 6, as depicted in FIG. 15, the fitting body 46D includes an inner fitting body 50D, which defines an inner body bore 52A in which the internal pressure sheath layer 26 and the carcass layer 37 of the pipe segment tubing 22C are disposed, as well as an outer fitting body 54D and a fitting body collar 56, which define an outer body bore 52B through which the pipe segment tubing 22D could potentially pull out (e.g., separate) from the pipe fitting 18D. In fact, in some embodiments, the pipe fitting 18D of FIG. 15 may generally match the pipe fitting 18A of FIG. 6.

However, as depicted in FIG. 15, the reinforcement strips 40D of the pipe segment tubing 22D include integrated out-of-plane protrusions 96 formed along their lengths, for example, instead of at their ends. To facilitate implementing an integrated out-of-plane protrusion 96, in some embodiments, an opening 76 may be formed in a reinforcement strip 40D of the pipe segment tubing 22D. In particular, in some such embodiments, the opening 76 may be formed to directly produce a corresponding integrated out-of-plane protrusion 96 in the reinforcement strip 40D, for example, due to the opening 76 being formed at least in part by pushing (e.g., deforming) solid material of the reinforcement strip 40D out-of-plane relative to the remainder of the reinforcement strip 40D. However, in other embodiments, an opening 76 may be formed in a reinforcement strip 40D to enable solid material adjacent the opening 76 to be bent out-of-plane.

Figure 16:
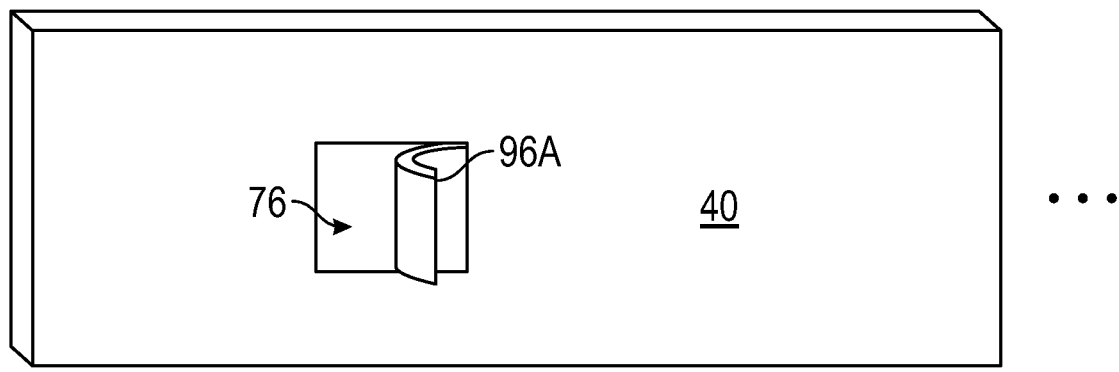
FIG. 16 is a top view of an example of a reinforcement strip in pipe segment tubing that includes an integrated out-of-plane protrusion, in accordance with an embodiment of the present disclosure.

To help illustrate, an example of a reinforcement strip 40 with an integrated out-of-plane protrusion 96A is shown in FIG. 16. As depicted, three sides of a rectangle are cut in the reinforcement strip 40 to form an opening 76 that encloses three sides of a flap of solid material. Additionally, as depicted, the flap of solid material may be bent (e.g., deformed) to form an integrated out-of-plane protrusion (e.g., hook) 96 along the length of the reinforcement strip 40.

However, it should be appreciated that the depicted example is merely intended to be illustrative and not limiting. In particular, as mentioned above, in other embodiments, formation of an opening 76 in a reinforcement strip 40 of pipe segment tubing 22 may directly produce a corresponding integrated out-of-plane protrusion 96 in the reinforcement strip 40. Additionally or alternatively, in other embodiments, an integrated out-of-plane protrusion 96 may be formed with a different shape.

Figure 17:
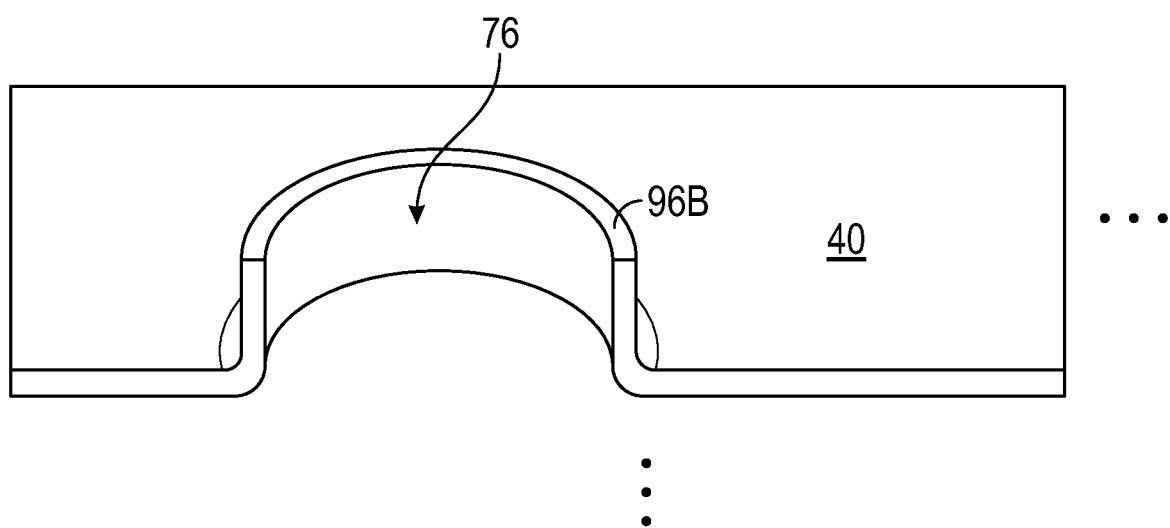
FIG. 17 is a perspective cross-sectional view of another example of a reinforcement strip in pipe segment tubing that includes an integrated out-of-plane protrusion, in accordance with an embodiment of the present disclosure.

To help illustrate, another example of a reinforcement strip 40 with an integrated out-of-plane protrusion 96B is shown in FIG. 17. Similar to FIG. 16, as depicted in FIG. 17, the reinforcement strip 40 includes an opening 76. Additionally, similar to FIG. 16, as depicted in FIG. 17, the integrated out-of-plane protrusion 96B is formed adjacent to the opening 76.

However, as depicted in FIG. 17, the integrated out-of-plane protrusion 96B has a circular shape, for example, instead of a rectangular shape and/or a hook shape. Additionally, in some embodiments, the integrated out-of-plane protrusion 96B may be formed due to formation of the opening 76 pushing (e.g., deforming) solid material of the reinforcement strip 40 out-of-plane relative to the remainder of the reinforcement strip 40, for example, via hole punching equipment. In other words, in such embodiments, the opening 76 and the integrated out-of-plane protrusion 96B may be formed during the same processing step, which, at least in some instances, may facilitate reducing the total number of processing steps for deploying a pipeline system 10 and, thus, improving deployment efficiency of the pipeline system 10.

In any case, returning to FIG. 15, as fluid (e.g., liquid) potting material is flowed into the potting cavity 60D of the pipe fitting 18D, the fluid potting material may fill the open space around the portion of the reinforcement strips 40A present in the potting cavity 60D. Thus, after curing (e.g., hardening and/or solidifying), a solid mass of potting material may encase the portion of the reinforcement strips 40D in the potting cavity 60D. In particular, after curing, cured (e.g., solid) potting material may bond to the portion of a reinforcement strips 40D in the potting cavity 60D as well as be implemented directly between an integrated out-of-plane protrusion 96 of the reinforcement strips 40D and the outer body bore 52B through which the pipe segment tubing 22D could potentially pull out (e.g., separate) from the pipe fitting 18D. In other words, in this manner, a reinforcement strip 40D of the pipe segment tubing 22D may be anchored in the potting cavity 60D of the pipe fitting 18D due to its bond with cured potting material in the potting cavity 60D as well as the resistance the cured potting material exerts against movement of the integrated out-of-plane protrusion 96 directly therethrough, which, at least in some instances, may facilitate improving anchoring strength, for example, by enabling the cured potting material to retain the reinforcement strip 40D under a force that would otherwise break the bond between the cured potting material and the reinforcement strip 40D.

However, it should be appreciated that the depicted example is merely intended to be illustrative and not limiting. In particular, in other embodiments, a reinforcement strip 40 of pipe segment tubing 22 may include a hooked end 68 as well as one or more other integrated out-of-plane protrusions 96 that are formed along the length of the reinforcement strip 40. Additionally or alternatively, in other embodiments, one or more pins 78 may be secured in corresponding openings 76 in a reinforcement strip 40 of pipe segment tubing 22 even when the reinforcement strip 40 includes an integrated out-of-plane protrusion 96. In any case, as described above, modifying the structure of a reinforcement strip 40 in pipe segment tubing 22 in accordance with the techniques described in the present disclosure may facilitate improving the strength with which the reinforcement strip 40 is anchored (e.g., secured) in the potting cavity 60 of a pipe fitting 18 and, thus, operational reliability of a pipeline system 10 in which the pipe fitting 18 and the pipe segment tubing 22 are deployed, for example, by enabling cured potting material in the pipe fitting 18 to retain the reinforcement strip 40 without relying solely on a bond therebetween.

Figure 18:
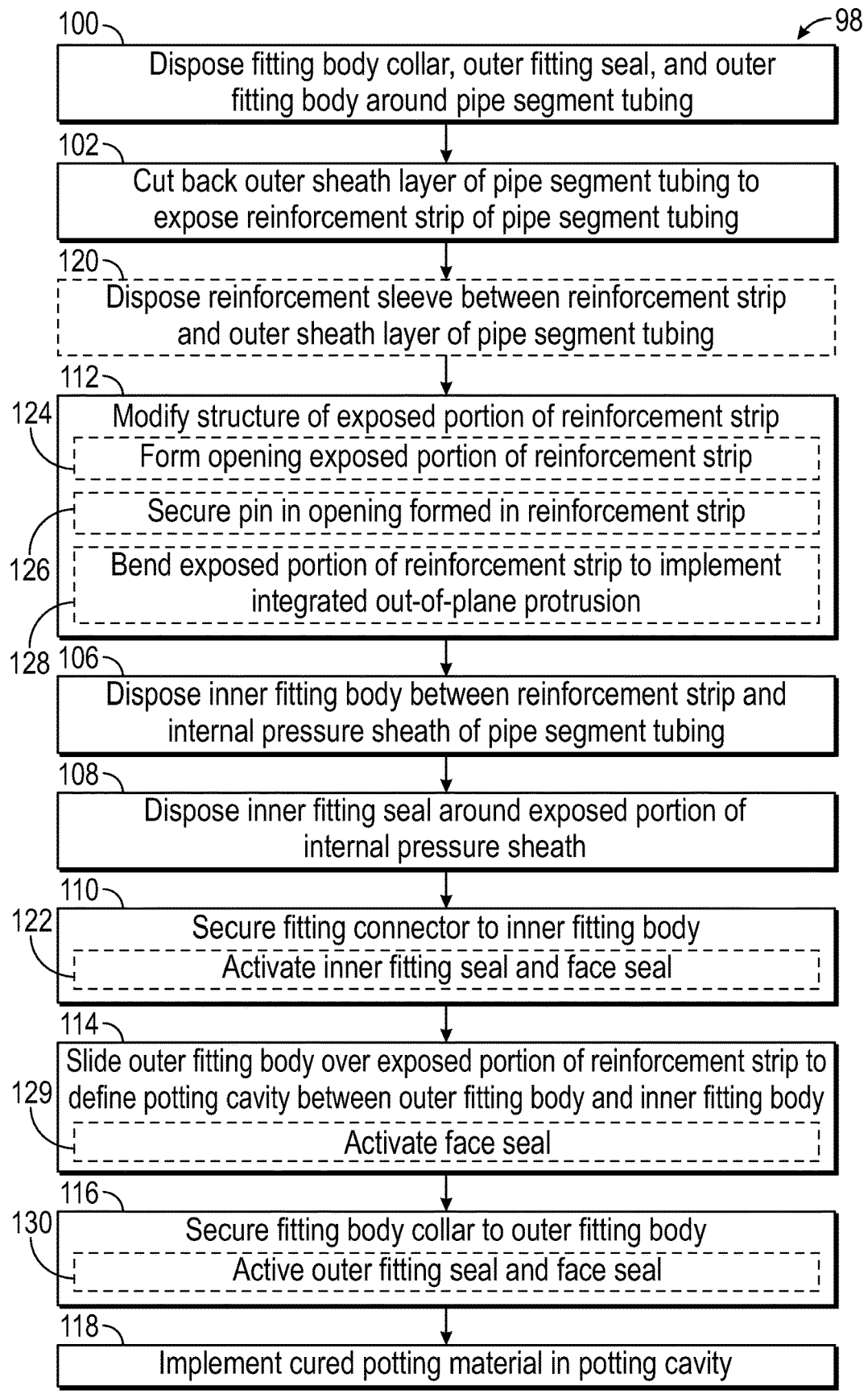
FIG. 18 is a flow diagram of an example of a process for securing and sealing a pipe segment in a pipe fitting, in accordance with an embodiment of the present disclosure.

To help further illustrate, an example of a process 98 for securing and sealing pipe segment tubing 22 in a pipe fitting 18 is described in FIG. 18. Generally, the process 98 includes disposing a fitting body collar, an outer fitting seal, and an outer fitting body around pipe segment tubing (process block 100), cutting back an outer sheath of the pipe segment tubing to expose a reinforcement layer of the pipe segment tubing (process block 102), and modifying structure of an exposed portion of the reinforcement layer (process block 112). Additionally, the process 98 generally includes disposing an inner fitting body between the reinforcement layer and an internal pressure sheath layer of the pipe segment tubing (process block 106), disposing an inner fitting seal around an exposed portion of the internal pressure sheath layer (process block 108), and securing a fitting connector to the inner fitting body (process block 110). Furthermore, the process 98 generally includes sliding the outer fitting body over the exposed portion of the reinforcement layer to define a potting cavity between the outer fitting body and the inner fitting body (process block 114), securing the fitting body collar to the outer fitting body (process block 116), and implementing cured potting material in the potting cavity (process block 118).

Although described in a specific order, which corresponds with an embodiment of the present disclosure, it should be appreciated that the example process 98 is merely intended to be illustrative and not limiting. In particular, in other embodiments, a process 98 for securing and sealing pipe segment tubing 22 in a pipe fitting 18 may include one or more additional process blocks and/or omit one or more of the depicted process blocks. For example, some embodiments of the process 98 may additionally include disposing a reinforcement sleeve between the reinforcement layer and the outer sheath of the pipe segment tubing (process block 120) while other embodiments of the process 98 do not. Additionally or alternatively, in other embodiments, one or more of the depicted process blocks may be performed in a different order, for example, such that the structure of the exposed portion of the reinforcement layer is modified after the inner fitting body is disposed between the reinforcement layer and the internal pressure sheath layer.

In any case, as described above, to facilitate sealing pipe segment tubing 22 therein, a pipe fitting 18 may include an outer fitting seal 48B. In particular, as described above, the outer fitting seal 48B may be compressed between an outer fitting body 54 of the pipe fitting 18, a fitting body collar 56 of the pipe fitting 18, and the outer sheath layer 28 of the pipe segment tubing 22. As such, securing and sealing the pipe segment tubing 22 in the pipe fitting 18 may include disposing (e.g., sliding) the fitting body collar 56, the outer fitting body 54, and the outer fitting seal 48B of the pipe fitting 18 around the pipe segment tubing 22 (process block 100).

Additionally, as described above, to facilitate securing pipe segment tubing 22 in a pipe fitting 18, a reinforcement strip 40 of the pipe segment tubing 22 may be anchored in a potting cavity 60 of the pipe fitting 18. Furthermore, as described above, the outer sheath layer 28 of pipe segment tubing 22 may be formed around one or more reinforcement strips 40 of the pipe segment tubing 22. Thus, to facilitate securing the pipe segment tubing 22 in the pipe fitting 18, the outer sheath layer 28 of the pipe segment tubing 22 may be cut back to expose a portion of a reinforcement strip 40 of the pipe segment tubing 22 (process block 102). Moreover, as described above, in some embodiments, a reinforcement sleeve 70 may be disposed between a remaining (e.g. non-cutback) portion of the outer sheath layer 28 and a corresponding portion of the reinforcement strip 40 (process block 120).

In any case, as described above, to facilitate improving anchoring strength and, thus, pipeline operational reliability, the structure of an exposed portion of a reinforcement strip 40 of pipe segment tubing 22 may be modified (e.g., changed and/or augmented) before it is anchored in a pipe fitting 18 (process block 112). In particular, as described above, in some embodiments, the structure of the reinforcement strip 40 may be modified at least in part by forming (e.g., drilling and/or cutting) one or more openings 76 (e.g., holes) in the reinforcement strip 40 (process block 124). In fact, as described above, in some such embodiments, an opening 76 may be formed in a reinforcement strip 40 at least in part by deforming solid material of the reinforcement strip 40 out-of-plane relative to the remainder of the reinforcement strip 40 and, thus, directly produce an integrated out-of-plane protrusion 96 in the reinforcement strip 40.

To facilitate further improving anchoring strength, as described above, in some embodiments, one or more pins 78 may be secured in corresponding openings 76 in a reinforcement strip 40 of pipe segment tubing 22 (process block 126). In particular, as described above, a pin 78 may be secured in an opening 76 in a reinforcement strip 40 of pipe segment tubing 22 at least in part by inserting a pin shaft of the pin 78 through the opening 76, thereby effectively attaching an (e.g., discrete) out-of-plane protrusion to the reinforcement strip 40. Additionally, as described above, in some such embodiments, a pin 78 (e.g., collar pin 78D or collar pin 78E) may include a pin shaft set 90 with multiple pin shafts that are each to be secured in a corresponding opening 76 in a reinforcement layer 34 of pipe segment tubing 22 and, thus, facilitate securing (e.g., circumferentially) the reinforcement layer 34 to itself, which, at least in some instances, may enable the reinforcement layer 34 to maintain and/or achieve its target lay angle and, thus, facilitate improving tensile strength and/or hoop strength provided by the reinforcement layer 34.

Additionally or alternatively, as described above, in some such embodiments, a pin 78 may include multiple pin shafts that are to be secured in openings 76 in different (e.g., adjacent) reinforcement strips 40 of pipe segment tubing 22. In other words, in such embodiments, the pin 78 may facilitate securing the different reinforcement strips 40 to one another, which, at least in some instances, may enable the reinforcement strips 40 to maintain and/or achieve corresponding target lay angles and, thus, facilitate improving tensile strength and/or hoop strength provided by the reinforcement strips 40. In fact, as described above, in some such embodiments, a pin body 88 of the pin 78 may be formed to remain outside the openings 76 and, thus, facilitate maintaining spacing between the different reinforcement strips 40 of the pipe segment tubing 22.

Moreover, as described above, in some embodiments, the structure of a reinforcement strip 40 of pipe segment tubing 22 may be modified at least in part by bending an exposed portion of the reinforcement strip 40 to form (e.g., implement) an integrated out-of-plane protrusion 96 (process block 128). In particular, as described above, in some such embodiments, an opening 76 may be formed in a reinforcement strip 40 such that a flap of solid material is formed along the length of the reinforcement strip 40. In such embodiments, the flap of solid material may then be bent out-of-plane relative to the remainder of the reinforcement strip 40 to produce an integrated out of plane protrusion 96. Additionally or alternatively, in some such embodiments, an exposed end of a reinforcement strip 40 may be bent to form an integrated out-of-plane protrusion 96—namely a hooked end 68.

In any case, as described above, to facilitate anchoring a reinforcement strip 40 of pipe segment tubing 22 therein, a pipe fitting 18 may include an inner fitting body 50, which is to be disposed between the reinforcement strip 40 and the internal pressure sheath layer 26 of the pipe segment tubing 22. As such, securing and sealing the pipe segment tubing 22 in the pipe fitting 18 may include disposing the inner fitting body 50 of the pipe fitting 18 between an exposed portion of the reinforcement strip 40 and the internal pressure sheath layer 26 of the pipe segment tubing 22 (process block 106). In particular, the inner fitting body 50 may be wedged between the reinforcement strip 40 and the internal pressure sheath layer 26 of the pipe segment tubing 22 (e.g., using special-purpose deployment equipment), thereby separating the reinforcement strip 40 from the internal pressure sheath layer 26 and, thus, exposing a portion of the internal pressure sheath layer 26.

Additionally, as described above, to facilitate sealing pipe segment tubing 22 therein, a pipe fitting 18 may include an inner fitting seal 48A. In particular, as described above, the inner fitting seal 48A may be compressed between the inner fitting body 50 of the pipe fitting 18, a fitting connector 44 of the pipe fitting 18, and the internal pressure sheath layer 26 of the pipe segment tubing 22. As such, securing and sealing pipe segment tubing 22 in a pipe fitting 18 may include disposing (e.g., sliding) the inner fitting seal 48A of the pipe fitting 18 around an exposed portion of the internal pressure sheath layer 26 of the pipe segment tubing 22 (process block 108).

To facilitate securing the pipe fitting 18 to another pipeline component (e.g., another pipe fitting 18, a bore fluid source 12, or a bore fluid destination 14) in addition to pipe segment tubing 22, a fitting connector 44 may then be secured to the inner fitting body 50 of the pipe fitting 18 (process block 110). In particular, as described above, in some embodiments, the fitting connector 44 may be secured to the inner fitting body 50 via one or more threaded fasteners 58, such as a bolt. In fact, as described above, in some embodiments, securing the fitting connector 44 to the inner fitting body 50 may compress the inner fitting seal 48A of the pipe fitting 18 between the inner fitting body 50, the fitting connector 44 of the pipe fitting 18, and the internal pressure sheath layer 26 of the pipe segment tubing 22, thereby activating the inner fitting seal 48A, in addition compressing a face seal 48C between the fitting connector 44 and the inner fitting body 50, thereby activating the face seal 48C (process block 122).

In any case, after the structure of a reinforcement strip 40 in the pipe segment tubing 22 is modified, the outer fitting body 54 of the pipe fitting 18 may be slid over the exposed portion of the reinforcement strip 40 to facilitate defining a potting cavity 60 in which the reinforcement strip 40 is to be anchored (process block 114). In other words, since the inner fitting body 50 of the pipe fitting 18 is disposed between the reinforcement strip 40 and the internal pressure sheath layer 26 of the pipe segment tubing 22, the outer fitting body 54 may be slid around the inner fitting body 50, thereby defining the potting cavity 60 between the inner surface 62 of the outer fitting body 54 and the outer surface 64 of the inner fitting body 50. Additionally, as described above, the outer fitting body 54 may have previously been slid around the pipe segment tubing 22 and, thus, the outer fitting body 54 may be disposed around the exposed portion of the reinforcement strip 40 by sliding the outer fitting body 54 in an opposite direction. Furthermore, to facilitate maintaining the potting cavity 60, as described above, in some embodiments, the outer fitting body 54 may be secured to the fitting connector 44 of the pipe fitting 18 via one or more threaded fasteners 58, such as a bolt, for example, such that a face seal 48C is compressed between the outer fitting body 54 and the inner fitting body 50 of the pipe fitting 18, thereby activating the face seal 48C (process block 129).

The fitting body collar 56 of the pipe fitting 18 may then be secured to the outer fitting body 54 (process block 116). In particular, as described above, in some embodiments, fitting body collar 56 may be secured to the outer fitting body 54 via one or more threaded fasteners 58, such as a bolt. In fact, as described above, in some embodiments, securing the fitting body collar 56 to the outer fitting body 54 may compress the outer fitting seal 48B of the pipe fitting 18 between the fitting body collar 56, the outer fitting body 54, and the outer sheath layer 28 of the pipe segment tubing 22, thereby activating the outer fitting seal 48B, in addition to compressing a face seal 48C between the fitting body collar 56 and the outer fitting body 54, thereby activating the face seal 48C (process block 130).

In any case, to facilitate anchoring the reinforcement strip 40 of the pipe segment tubing 22 in the potting cavity 60 of the pipe fitting 18, as described above, cured potting material may be implemented in the potting cavity 60 (process block 118). In particular, to implement cured potting material in the potting cavity 60, as described above, fluid (e.g., liquid) potting material, such as epoxy, may be flowed (e.g., filled) into the potting cavity 60, for example, via a potting material port 66 formed on the pipe fitting 18. After curing (e.g., hardening and/or solidifying), a solid mass of cured potting material may encase the portion of the reinforcement strip 40 in the potting cavity 60. More specifically, the cured potting material may bond to the portion of the reinforcement strip 40 in the potting cavity 60 and, thus, facilitate anchoring the reinforcement strip 40 in the potting cavity 60.

However, as described above, the structure of the reinforcement strip 40 may be modified to produce an out-of-plane protrusion, such as a hooked end 68, that is integrated with the reinforcement strip 40 and/or to enable an (e.g., discrete) out-of-plane protrusion, such as a pin 78, to be attached thereto. As described above, an out-of-plane protrusion integrated with or attached to the reinforcement strip 40 may be present in the potting cavity 60 and, thus, encased in cured (e.g., solid) potting material. Accordingly, after curing, cured (e.g., solid) potting material may be implemented directly between the out-of-plane protrusion and an outer body bore 52B through which the pipe segment tubing 22 could potentially pull out (e.g., separate) from the pipe fitting 18, thereby resisting (e.g., blocking) movement of the out-of-plane protrusion toward the outer body bore 52B directly therethrough and, thus, improving the strength with which the reinforcement strip 40 is anchored in the pipe fitting 18, for example, by enabling the cured potting material to retain the reinforcement strip 40 without relying solely on the bond therebetween. In this manner, the techniques described in the present disclosure may facilitate improving the strength with which pipe segment tubing 22 can be secured in a pipe fitting 18, which, at least in some instances, may facilitate improving operational reliability of a pipeline system 10 in which the pipe segment tubing 22 and the pipe fitting 18 are deployed, for example, by enabling cured potting material in the pipe fitting 18 to retain a reinforcement strip 40 of the pipe segment tubing 22 under a force that would otherwise break a bond therebetween.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A system comprising:
    pipe segment tubing, wherein the pipe segment tubing comprises a first reinforcement strip and a second reinforcement strip implemented between an internal pressure sheath layer and an outer sheath of the pipe segment tubing;
    a pipe fitting configured to be secured to the pipe segment tubing, wherein the pipe fitting comprises:
        an inner fitting body configured to be inserted between the internal pressure sheath layer and the first reinforcement strip of the pipe segment tubing; and
        an outer fitting body configured to be disposed circumferentially around the inner fitting body to define a potting cavity between an inner surface of the outer fitting body and an outer surface of the inner fitting body, wherein a first hole is formed through the first reinforcement strip of the pipe segment tubing and a second hole is formed through the second reinforcement strip of the pipe segment tubing before the first reinforcement strip and the second reinforcement strip are anchored in the potting cavity via cured potting material; and
    a pin, wherein the pin comprises:
        a first pin shaft configured to be secured in the first hole in the first reinforcement strip of the pipe segment tubing; and
        a second pin shaft configured to be secured in the second hole in the second reinforcement strip of the pipe segment tubing to facilitate securing the first reinforcement strip and the second reinforcement strip to one another.

2. The system of claim 1, wherein:
    the first pin shaft of the pin is configured to extend through the first hole in the first reinforcement strip to enable cured potting material in the pipe fitting to be implemented directly between the first pin shaft and an opening of the potting cavity; and
    the second pin shaft of the pin is configured to extend through the second hole in the second reinforcement strip to enable cured potting material in the pipe fitting to be implemented directly between the second pin shaft and the opening of the potting cavity.

3. The system of claim 1, wherein the pin comprises a pin body, wherein the first pin shaft and the second pin shaft extend out from the pin body.

4. The system of claim 3, wherein the pin body of the pin is configured to remain between the first reinforcement strip and the second reinforcement strip of the pipe segment tubing to facilitate maintaining spacing between the first reinforcement strip and the second reinforcement strip.

5. The system of claim 3, wherein the first pin shaft and the second pin shaft of the pin are not linearly aligned to enable the first hole to be formed at a first more central location along a first width of the first reinforcement strip, the second hole to be formed at a second more central location along a second width of the second reinforcement strip, or both.

6. The system of claim 1, wherein:
    the pipe segment tubing comprises a reinforcement layer that includes the first reinforcement strip and the second reinforcement strip; and
    the pin comprises a ring pin body, wherein the first pin shaft and the second pin shaft extend out radially from the ring pin body to facilitate circumferentially securing the reinforcement layer to itself.

7. The system of claim 1, wherein the potting cavity of the pipe fitting comprises a wedge-shaped axial cross-section profile configured to compress cured potting material in the potting cavity against a first portion of the first reinforcement strip in the potting cavity, a second portion of the second reinforcement strip in the potting cavity, a surface of the potting cavity, or any combination thereof when a force tries to pull the pipe segment tubing and the pipe fitting away from one another.

8. A system, comprising:
    a pipe segment configured to be secured and sealed in a pipe fitting, wherein the pipe segment comprises:
        an internal pressure sheath that defines a pipe bore through the pipe segment;
        a first reinforcement strip and a second reinforcement strip implemented around the internal pressure sheath, wherein the first reinforcement strip and the second reinforcement strip are implemented using solid material that has a higher tensile strength, a higher linear elasticity modulus, or both as compared to solid material that is used to implement the internal pressure sheath of the pipe segment; and
        an outer sheath implemented around the first reinforcement strip and the second reinforcement strip, wherein:
            the outer sheath is configured to be cut back to expose a first portion of the first reinforcement strip and a second portion of the second reinforcement strip that are to be anchored in a potting cavity of the pipe fitting at least in part using cured potting material implemented within the potting cavity; and
            structure of the first reinforcement strip and the second reinforcement strip are configured to be modified before being anchored in the potting cavity of the pipe fitting at least in part by forming a first opening through the first reinforcement strip and forming a second opening through the second reinforcement strip; and
    a pin, wherein the pin comprises:
        a first pin shaft configured to be secured in the first opening in the first reinforcement strip of the pipe segment; and
        a second pin shaft configured to be secured in the second opening in the second reinforcement strip of the pipe segment to facilitate securing the first reinforcement strip and the second reinforcement strip to one another.

9. The system of claim 8, wherein the pin comprises a pin body, wherein the first pin shaft and the second pin shaft extend out from the pin body.

10. The system of claim 9, wherein the pin body of the pin is configured to remain between the first reinforcement strip and the second reinforcement strip of the pipe segment to facilitate maintaining spacing between the first reinforcement strip and the second reinforcement strip.

11. The system of claim 8, comprising a reinforcement sleeve configured to be disposed between the outer sheath and the first reinforcement strip of the pipe segment, wherein the reinforcement sleeve is implemented using solid material that has a higher linear elasticity modulus as compared to solid material that is used to implement the outer sheath of the pipe segment.

12. The system of claim 8, wherein:
the first pin shaft of the pin is configured to extend through the first opening in the first reinforcement strip of the pipe segment to enable cured potting material to be implemented directly between the first pin shaft and an opening of the potting cavity in the pipe fitting; and
the second pin shaft of the pin is configured to extend through the second opening in the second reinforcement strip of the pipe segment to enable cured potting material to be implemented directly between the second pin shaft and the opening of the potting cavity in the pipe fitting.

13. The system of claim 8, wherein:
the pipe segment comprises a reinforcement layer that includes the first reinforcement strip and the second reinforcement strip; and
the pin comprises a ring pin body, wherein the first pin shaft and the second pin shaft extend out radially from the ring pin body to facilitate circumferentially securing the reinforcement layer to itself.

14. A system, comprising:
a pipe fitting configured to be secured to a pipe segment, wherein the pipe fitting comprises:
an inner fitting body configured to be inserted between an internal pressure sheath layer and a first reinforcement strip of the pipe segment; and
an outer fitting body configured to be disposed circumferentially around the inner fitting body to define a potting cavity between an inner surface of the outer fitting body and an outer surface of the inner fitting body; and
a pin, wherein the pin comprises:
a first pin shaft configured to be secured in a first hole in the first reinforcement strip of the pipe segment, wherein the first hole is formed through the first reinforcement strip before the first reinforcement strip is anchored in the potting cavity of the pipe fitting via cured potting material; and
a second pin shaft configured to be secured in a second hole in a second reinforcement strip of the pipe segment to facilitate securing the first reinforcement strip and the second reinforcement strip to one another, wherein the second hole is formed through the second reinforcement strip before the second reinforcement strip is anchored in the potting cavity of the pipe fitting via cured potting material.

15. The system of claim 14, wherein the pin comprises a pin body, wherein the first pin shaft and the second pin shaft extend out from the pin body.

16. The system of claim 15, wherein the pin body of the pin is configured to remain between the first reinforcement strip and the second reinforcement strip of the pipe segment to facilitate maintaining spacing between the first reinforcement strip and the second reinforcement strip.

17. The system of claim 15, wherein the first pin shaft and the second pin shaft of the pin are not linearly aligned to enable the first hole to be formed at a more central location along a first width of the first reinforcement strip, the second hole to be formed at a second more central location along a second width of the second reinforcement strip, or both.

18. The system of claim 14, wherein:
the first pin shaft of the pin is configured to extend through the first hole in the first reinforcement strip to enable cured potting material to be implemented directly between the first pin shaft and an opening of the potting cavity in the pipe fitting; and
the second pin shaft of the pin is configured to extend through the second hole in the second reinforcement strip to enable cured potting material to be implemented directly between the second pin shaft and the opening of the potting cavity in the pipe fitting.

19. The system of claim 14, wherein:
the first reinforcement strip and the second reinforcement strip are included in a reinforcement layer of the pipe segment; and
the pin comprises a ring pin body, wherein the first pin shaft and the second pin shaft extend out radially from the ring pin body to facilitate circumferentially securing the reinforcement layer of the pipe segment to itself.

20. The system of claim 14, wherein the potting cavity of the pipe fitting comprises a wedge-shaped axial cross-section profile configured to compress cured potting material in the potting cavity against a first portion of the first reinforcement strip in the potting cavity, a second portion of the second reinforcement strip in the potting cavity, a surface of the potting cavity, or any combination thereof when a force tries to pull the pipe fitting away from the pipe segment.

* * * * *